US012008466B1

(12) United States Patent
Huang et al.

(10) Patent No.: US 12,008,466 B1
(45) Date of Patent: Jun. 11, 2024

(54) PROCESSOR WITH CONTROL FLOW

(71) Applicant: Amazon Technologies, Inc., Seattle, WA (US)

(72) Inventors: Randy Huang, Morgan Hill, CA (US); Ron Diamant, Albany, CA (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 1030 days.

(21) Appl. No.: 15/934,469

(22) Filed: Mar. 23, 2018

(51) Int. Cl.
*G06N 3/08* (2023.01)

(52) U.S. Cl.
CPC ...................... *G06N 3/08* (2013.01)

(58) Field of Classification Search
CPC ........................................ G06N 3/08
See application file for complete search history.

(56) References Cited

U.S. PATENT DOCUMENTS 9,842,293 B2 * 12/2017 Young .................. G06N 3/08
10,318,317 B2   6/2019 Bajic et al.

OTHER PUBLICATIONS

Panda, P., et al, Conditional Deep Learning for Energy-Efficient and Enhanced Pattern Recognition [online], 2016, Retrieved from Internet :<URL:https://ieeexplore.ieee.org/stamp/stamp.jsp?tp=&arnumber=7459357> (Year:2016) (Year: 2016).*

Yan, Z et al, HD-CNN: Hierarchical Deep Convolutional Neural Network for Large Scale Visual Recognition, [retrieved on Dec. 15, 2021]. Retrieved from Internet: <https://openaccess.thecvf.com/content_iccv_2015/html/Yan_HD-CNN_Hierarchical_Deep_ICCV_2015_paper.html> (Year: 2015).*
Panda, P., et al, Conditional Deep Learning for Energy-Efficient and Enhanced Pattern Recognition [online], 2016, Retrieved from Internet :<URL:https://ieeexplore.ieee.org/stamp/stamp.jsp?tp=&arnumber=7459357> (Year: 2016).*
Teerapittayanon, S et al, BranchyNet: Fast Inference via Early Exiting from Deep Neural Networks [online], 2016, Retrieved from Internet: <https://ieeexplore.ieee.org/stamp/stamp.jsp?tp=&arnumber=7900006> (Year: 2016).*
Loannou, Y., Decision Forests, Convolutional Networks and the Models in-Between, [retrieved Nov. 30, 2022]. Retrieved from Internet: <https://arxiv.org/abs/1603.01250> (Year: 2016).*
Mvienne Sze, et al., Efficient Processing of Deep Neural Networks: A Tutorial and Survey, Aug. 13, 2017, 32 pages.
Gao Huang, et al., Multi-Scale Dense Networks for Resource Efficient Image Classification, Nov. 6, 2017, 14 pages.

* cited by examiner

*Primary Examiner* — Miranda M Huang
*Assistant Examiner* — Bart I Rylander
(74) *Attorney, Agent, or Firm* — Kilpatrick Townsend & Stockton LLP

(57) ABSTRACT

In various implementations, provided are systems and methods for operating a neural network that includes conditional structures. In some implementations, an integrated circuit can compute a result using a set of intermediate results, where the intermediate results are computed from the outputs of a hidden layer of the neural network. The integrated circuit can further test the result against a condition. The outcome of the test can determine a next layer that the integrated circuit is to execute, or can be used to determine that further execution of the neural network can be terminated.

11 Claims, 14 Drawing Sheets

1200

Receiving input data at the integrated circuit, the integrated circuit including an array of processing engines and a memory operable to store weight values and instructions for the neural network, and wherein the integrated circuit is operable to use the weight values to perform a task defined for the neural network
1202

Computing a result using a set of intermediate results, wherein the array of processing engines compute the result using a set of weight values stored in the memory
1204

Reading a conditional instruction from the memory
1208

Writing a value to a storage location, the value indicating whether the result meets a condition indicated by the conditional instruction
1210

PROCESSOR WITH CONTROL FLOW

BACKGROUND

Neural networks attempt to replicate, using computer technology, logical reasoning performed by the biological neural networks that constitute animal brains. Neural networks take inspiration from the mechanics of the operation of the human brain. In a neural network, neurons are represented by nodes and synapses are represented by weighted connections between the nodes. The weights can reflect different responses to input. A neural network can be arranged in layers, where input data to be analyzed is provided to an input layer, and the outputs of each layer provide the inputs to the next layer. The last layer can output a result. The weight values can be determined through training, during which input data with a known result is provided to the neural network.

Neural networks can be implemented using a Central Processing Unit (CPU) to perform the computations. CPUs, however, tend to be optimized for sequential rather than parallel computations, and thus can suffer from poor response times. Graphics Processing Units (GPUs) are optimized for parallel computations, but not necessarily for the result from one computation unit to be provided directly to another computation unit. Often, the result must first be written to a memory. GPUs, though having better response times than CPUs, may nevertheless lag in response times.

Special-purpose neural network processors include computation arrays optimized for parallel, chained computations, and can perform better than both CPUs and GPUs on the same input data, in certain situations.

BRIEF DESCRIPTION OF THE DRAWINGS

Various embodiments in accordance with the present disclosure will be described with reference to the drawings, in which:

FIG. 12 illustrates an example of process for operating a neural network that can include conditional layers.

DETAILED DESCRIPTION

Figure 1:
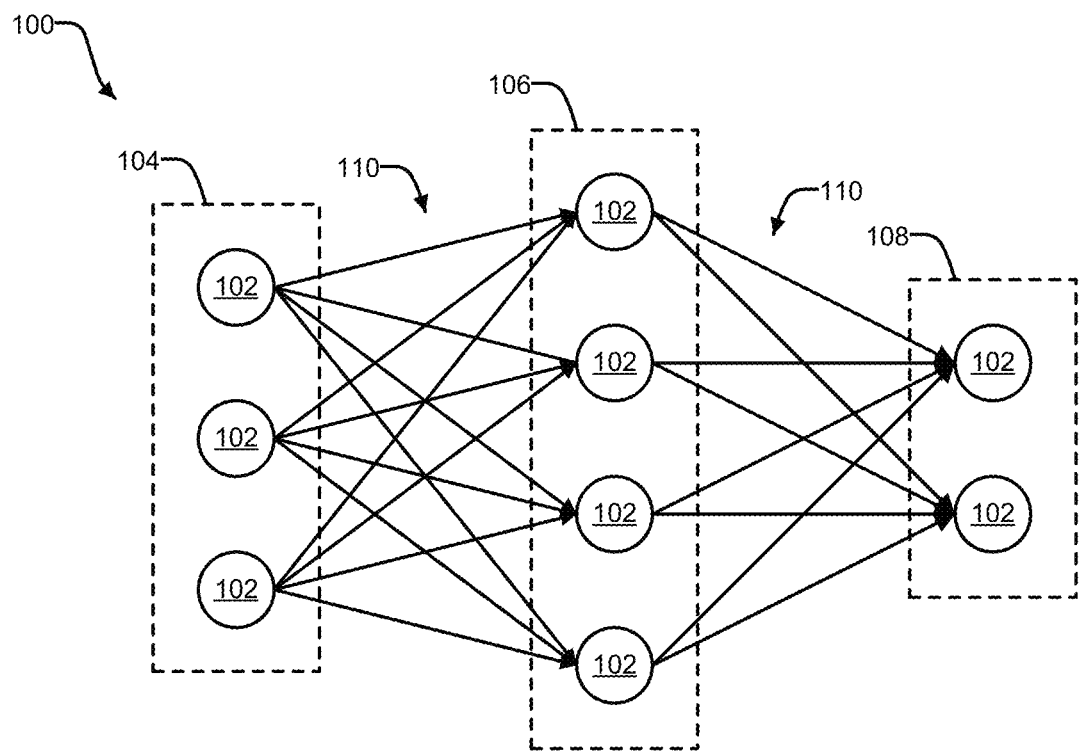
FIG. 1 illustrates an example of visual model for a neural network.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Artificial neural networks (which will be referred to herein as neural networks) are part of the field of artificial intelligence (AI), an area of research and engineering seeking to build intelligent machines that can make decisions in the same way that humans do. Neural networks fall within a sub-field of artificial intelligence called machine learning. Machine learning is a field of study that investigates giving computers the ability to learn without being explicitly programmed. A program that implements a machine learning algorithm is able to learn to do tasks without the program needing to include code that accounts for every possibility, and code that describes all possible behaviors.

In various examples, the architecture of a neural network includes an input layer, an output layer, and a number of intermediate layers, often referred to as hidden layers. Each layer executes a computation on the outputs of the previous layer, with the last layer (the output layer) providing a final result. With more layers, a neural network can, theoretically, perform more complex tasks, such as language translations and distinguishing the contents of one image from another. A neural network with more than three hidden layers is sometimes referred to as a deep neural network. Deep neural networks can have many hidden layers, such as, for example, between five and more than a thousand layers.

To obtain a result from a neural network, in some examples, a computing system executing the neural network will execute the same number of computations for each different input data. This is because the computing system will sequentially execute the computations for each layer, starting with the input layer and stopping with the output layer. Thus, for an image of a cat, the computing system may execute 80,000 tera-operations per second (teraops) in executing the neural network to obtain an identification, and for an image of a dog, the computing system may also execute 80,000 teraops.

For some inputs, however, the neural network may be able to obtain an adequate result without having to execute all the layers of the neural network. For example, for a particular image of a dog, the neural network may, after the computing system has executed, for example, five layers of the neural network, the output of the fifth layer may indicate, with 99% certainty, that the image includes a dog.

To take advantage of the possibility that a neural network can, for at least some inputs, reach an adequate result without needing to execute all layers in the neural network, some neural network architectures can, between certain layers, check whether a layer has produced a result that is sufficient. For example, the neural network can include an intermediate step, which will be referred to herein as a conditional layer, between one layer and a second layer. In this example, the conditional layer can include a function, such as softmax, that operates on the outputs of the first layer to produce a result. The conditional layer can further include a condition against which the result from the function is compared. For example, the condition can be a threshold value, and the conditional layer can test whether the result from the first layer is greater than the threshold. In this example, the neural network can be configured such that, when the condition is met (e.g., the result is greater than the threshold), the neural network uses the result of the first layer as the result, and does not need to execute any further layers.

In various implementations, provided is an integrated circuit for a neural network processor, which is able to make use of conditional layers in a neural network to reduce the number of computations that the integrated circuit needs to execute in order to perform a task for which the neural network was trained. In various implementations, the integrated circuit can include an array of processing engines for executing parallel, cascading computations. The integrated circuit can further include memory banks, placed local to the array of processing engines (e.g., on the same die), for fast, temporary storage of weight values and instructions for a neural network, and for storing intermediate results. The instructions for the neural network can include a conditional instruction that configures the array of processing engines to compute a result from the intermediate values of an immediately preceding layer of the neural network. The conditional instruction can, further, define a condition. For example, the condition can be to check whether the result from the preceding layer exceeds a threshold. When the result from the preceding layer meets the condition, the integrated circuit can store a value (e.g., in the memory banks) that indicates the condition was met. When the condition is not met, the integrated circuit can store a different value.

In some examples, as a result of the integrated circuit determining whether the condition has been met, the system that includes the integrated circuit can take various actions. For example, the system may determine to terminate executing any further layers of the neural network. In this example, the system can let the neural network processor finish the computations for a current layer, and can then start the neural network processor on a new task (for example, by giving the neural network processor new input and instructing the neural network processor to start processing the input layer). Alternatively or additionally, the system can instruct the neural network processor to cease operations, and possibly flush any in-progress calculations, so that the neural network processor can start on a new task.

As another example, the neural network may be architected with branches, such that, when the condition at a conditional layer is met, the neural network will continue executing at one layer, while, when the condition is not met, the neural network will continue executing at a second layer. In this example, once the neural network processor has determined whether the condition has been met, the system that includes the neural network processor can select the next layer on which the neural network processor will work. In some examples, the neural network processor is capable of determining a next layer with which to proceed. In some examples, software executing on a host processor can determine whether the neural network should proceed, and possibly also at which layer of the neural network processing should proceed. In these examples, the software can be a program that is using the neural network to make determinations.

In these and other examples, depending on the design of the neural network, the number of computations a neural network processor needs to execute to provide a reasonable result can be reduced significantly, with a commensurate reduction in the amount of time needed to provide the result. In the aggregate, when the neural network processor executes the neural network to perform a task many times, the reduction in time can be as much as half.

Neural networks take inspiration from the mechanics of the operation of the human brain, to the extent that these operations are understood. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

FIG. 1 illustrates an example of a visual model 100 for a neural network. In this example, the model 100 includes an input layer 104, a middle layer that is often referred to as a hidden layer 106, and an output layer 108. Each layer includes some number of nodes 102. In this example, the nodes 102 of the input layer 104 are connected to each node 102 of the hidden layer 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user. The outputs of the nodes 102 can be referred to as activations, in keeping with the brain model.

An example of a computation that can occur at each layer in the example model 100 is as follows:

$$y_j = f\left(\sum_{i=1}^{3} W_{ij} \times x_i + b\right)$$

In the above equation, $W_{ij}$ is a weight, $x_i$ is an input activation, $y_j$ is an output activation, f( ) is a non-linear function, and b is a bias term. Various non-linear functions can be used to achieve different purposes.

The model 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

A neural network that has more than three layers (e.g., more than one hidden layer) is sometimes referred to as a deep neural network. Deep neural networks can have, for example, five to more than a thousand layers.

Neural networks with many layers can be capable of learning high-level features than shallower networks, where the features have more complexity and abstraction. As an example, a neural network can be taught to recognize images. In this example, pixels of an image can be fed into the input layer of the neural network, and the outputs of the first layer can indicate the presence of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, can output the probability that an audio sequence contains a particular word, can generate a bounding box around an object in an image, or can propose an action that should be taken. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Neural networks have been used for a variety of applications, including, for example, in the areas of image and video, speech and language, medicine, game play, and robotics. In image and video, neural networks have been used for image classification, object localization and detection, image segmentation, and action recognition. In speech and language, neural networks have been used for speech recognition, machine translation, natural language processing, and audio generation. In the medical field, neural networks have been used in genomics and medical imaging. In game play, neural networks have been used to play video and board games, including games with immense numbers of possible moves such as Go. In robotics, neural networks have been used for motion planning of a robot, visual navigation, control stabilization, and driving strategies for autonomous vehicles.

Figure 2A:
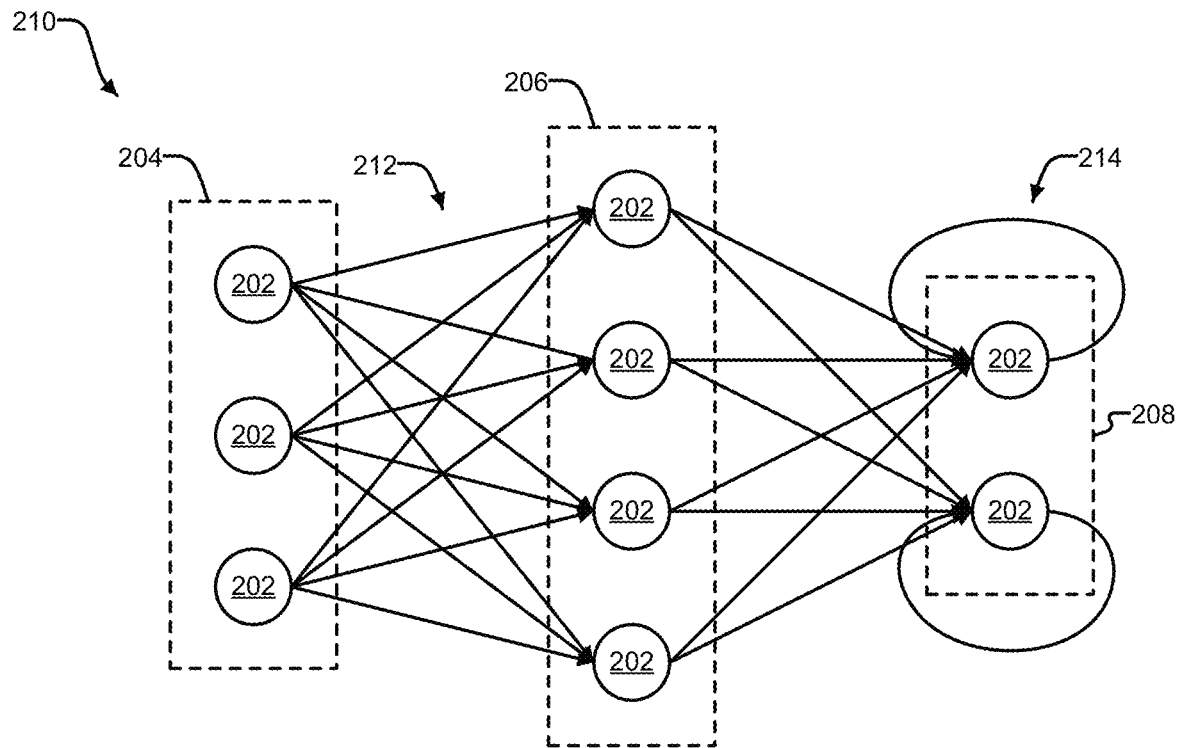
FIG. 2A illustrates an example of a model for a neural network that includes feed-forward weights and recurrent weights.

Different varieties of neural networks have been developed. Various examples of neural networks can be divided into two forms: feed-forward and recurrent. FIG. 2A illustrates an example of a model 210 for a neural network that includes feed-forward weights 212 between an input layer 204 and a hidden layer 206, and recurrent weights 214 at the output layer 208. In a feed-forward neural network, the computation is a sequence of operations on the outputs of a previous layer, with the final layer generating the outputs of the neural network. In the example illustrated in FIG. 2A, feed-forward is illustrated by the hidden layer 206, whose nodes 202 operate only the outputs of the nodes 202 in the input layer 204. A feed-forward neural network has no memory and the output for a given input can be always the same, irrespective of any previous inputs given to the neural network. The Multi-Layer Perceptron (MLP) is one type of neural network that has only feed-forward weights.

In contrast, recurrent neural networks have an internal memory that can allow dependencies to affect the output. In a recurrent neural network, some intermediate operations can generate values that are stored internally and can be used as inputs to other operations, in conjunction with the processing of later input. In the example of FIG. 2A, recurrence is illustrated by the output layer 208, where the outputs of the nodes 202 of the output layer 208 are connected back to the inputs of the nodes 202 of the output layer 208. These looped-back connections can be referred to as recurrent weights 214. Long Short-Term Memory (LSTM) is a frequently used recurrent neural network variant.

Figure 2B:
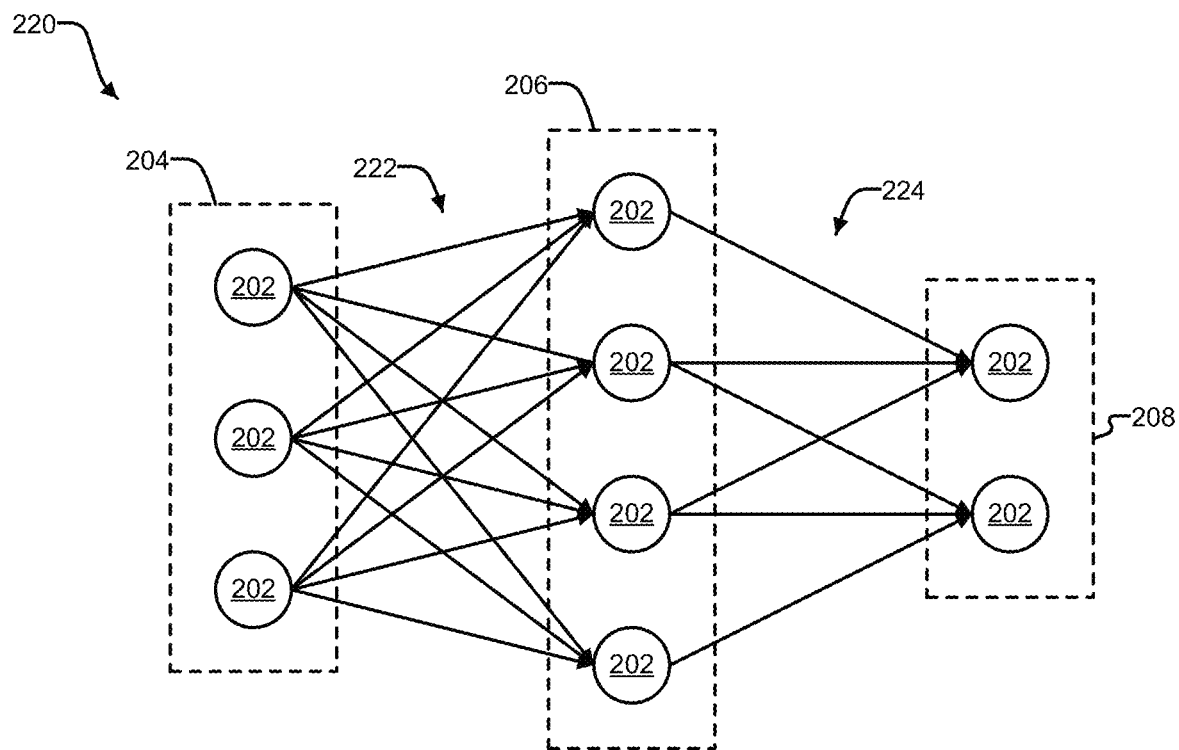
FIG. 2B illustrates an example of a model for a neural network that includes different connection types.

FIG. 2B illustrates an example of a model 220 for a neural network that includes different connection types. In this example model 220, the input layer 204 and the hidden layer 206 are fully connected 222 layers. In a fully connected layer, all output activations are composed of the weighted input activations (e.g., the outputs of all the nodes 202 in the input layer 204 are connect to all of the inputs of the hidden layer 206). Fully connected layers can require a significant amount of storage and computations. Multi-Layer Perceptron neural networks are one type of neural network that is fully connected.

In some applications, some connections between the activations can be removed, for example by setting the weights for these connections to zero, without affecting the accuracy of the output. The result is sparsely connected 224 layers, illustrated in FIG. 2B by the weights between the hidden layer 206 and the output layer 208. Pooling is another example of a method that can achieve sparsely connected 224 layers. In pooling, the outputs of a cluster of nodes can be combined, for example by finding a maximum value, minimum value, mean value, or median value.

The efficiency of operating a neural network can be further improved in several different ways. For example, the number of weights that contribute to an output can be limited by having the output be a function of only a fixed-sized window of inputs. Even further efficiency can be gained when the same set of weights are used in the calculation of every output. Repeated use of the same weight values is referred to as weight sharing, and can significantly reduce the storage requirements for weights.

Windowing and weight sharing in a neural network layer can be accomplished by structuring the computation executed at each node as a convolution. Convolution is a mathematical operation that can be used to extract features from an input. Convolution preserves the spatial relationship between pixels by learning image features using small areas of input data.

Figure 3:
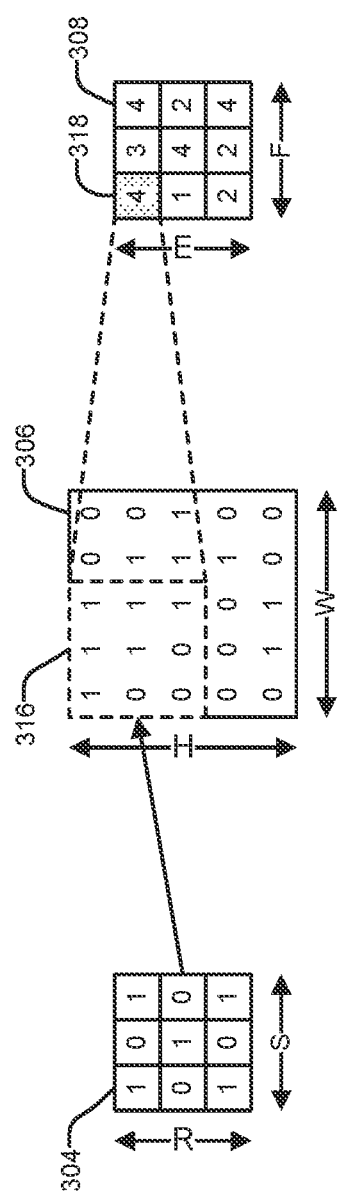
FIG. 3 illustrates an example of a two-dimensional convolution.

FIG. 3 illustrates an example of a two-dimensional convolution, which could be performed during image recognition. In this example, a filter plane 304 is a set of weights arranged in a matrix having a height R and a width S. The values in the filter plane 304 can be selected to filter for particular features, such as lines, edges, curves, corners, blobs, ridges, and so on. The filter plane 304 can also be referred to as a kernel or a feature detector.

The filter plane 304 is applied to a two-dimensional matrix of values that represent the input to the convolution. The two-dimensional matrix is referred to as an input feature map 306. The input feature map 306 can include values for a component of the input. For example, when the input is a color image, the input feature map 306 can include the color values for one color, such as red, for each pixel in the image, with the values indicating an intensity of the color. In this example, additional feature maps can include the other color values for the pixels, one for blue and one for green. In this example, each input feature map is treated as a separate channel. In a black and white image, each pixel value can be represented using a single value that indicates an intensity between white and black. Thus, in some examples, black and white images can be represented using a single channel.

The convolution operation involves computing a value for each possible position of the filter plane 304 over the input feature map 306 by multiplying each filter plane 304 by the corresponding feature map value and summing the result. For example, at a first position 316, multiply each value in the filter plane 304 by each corresponding value in the first position 316 results in a matrix {(1, 0, 1), (0, 1, 0), (0, 0, 1)}. In this example, the sum of the values in the matrix results in the value 4, which is placed in a corresponding first position 318 in an output feature map 308. A region of values from the input feature map 306 can be referred to as input activations. The result of the multiplication and summation can be referred to as an output activation. The output feature map 308 represents a higher-level abstraction of the input feature map 306, and has a height E and a width F. In various examples, additional filters can be applied to the same input feature map 306 to produce additional output feature maps.

Figure 4:
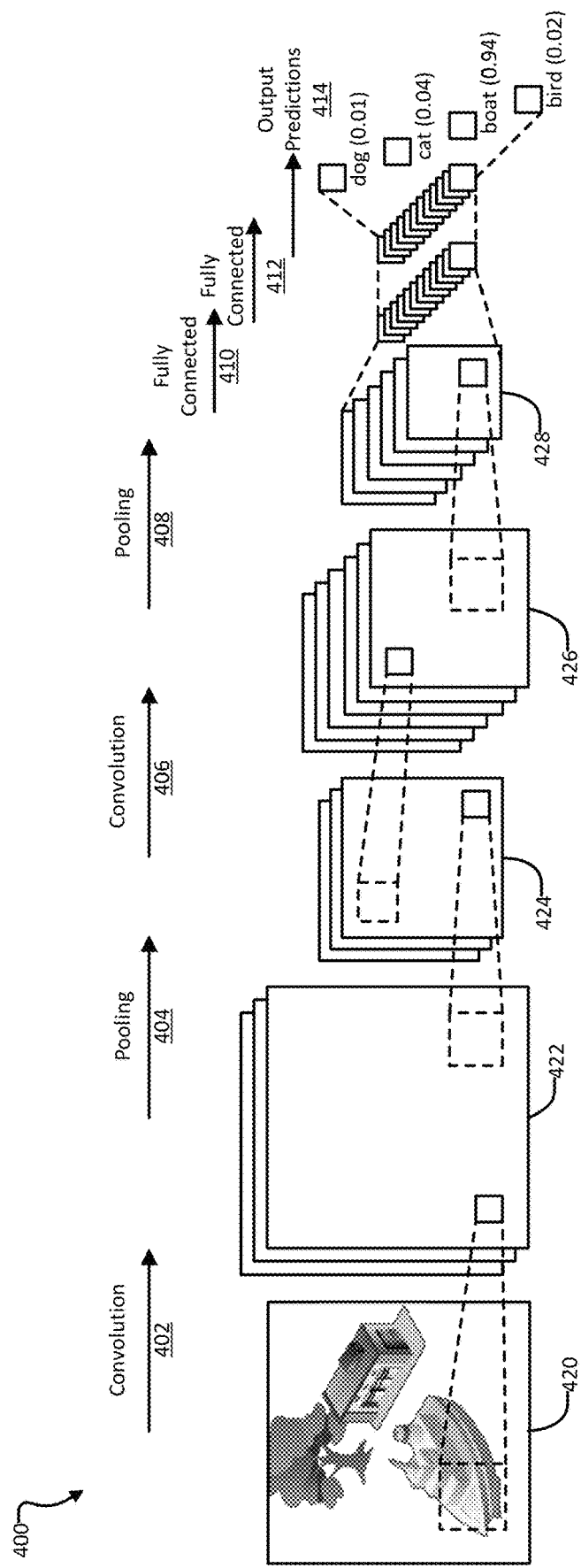
FIG. 4 is an example configuration of a convolutional neural network.

FIG. 4 is an example configuration of a convolutional neural network 400. The example of FIG. 4 illustrates operations that can be included in a convolutional neural network, including convolution, application of non-linearity, pooling or sub-sampling, and output generation (e.g., a fully connected layer). Any given convolutional network includes at least one convolution layer, and can have tens of convolution layers. Additionally, each convolutional layer need not be followed by a pooling layer. In some examples, a pooling layer may occur after multiple convolution layers, or may not occur at all. The example convolution network illustrated in FIG. 4 classifies an input image 420 into one of four categories: dog, cat, boat, or bird. In the illustrated example, on receiving an image of a boat as input, the example neural network outputs the highest probability for "boat" (0.94) among the output predictions 414.

To produce the illustrated output predictions 414, the example convolutional neural network performs a first convolution 402 that can also include application of non-linearity; a first pooling 404 operation; a second convolution 406 that may also include application of non-linearity; a second pooling 408 operation; and then categorization using a first fully-connected 410 layer and a second fully-connected 412 layer. The output of the first convolution 402 is a set of one or more output feature maps 422, which are provided as inputs to the first pooling 404 operation The first pooling 404 operation produces a set of feature maps 424 that are provided as inputs to the second convolution 406. The second convolution 406 also produces a set of output feature maps 426, which can describe the input image 420 at a more abstract level. The second pooling 408 step also produces feature maps 428, which are input into the first fully-connected 410 layer. The first fully-connected 410 layer accumulates the values in the feature maps 428, and the result is input into the second fully-connected 412 layer. The outputs of the second fully-connected 412 layer are the output predictions 414. FIG. 4 is an example configuration of a convolutional neural network. Other examples can include additional or fewer convolution operations, non-linearity operations, pooling operations, and/or fully-connected layers.

Non-linearity can be added after some convolution operations. Convolution is a linear operation, and in some examples, it is assumed that the real-world data the convolutional neural network is to learn about is non-linear. Thus, a non-linear function can be applied, element-wise, to the output feature maps from a convolution. One such non-linear function is provided by a Rectified Linear Unit (ReLU), whose output is given by Output=Max (0, Input). Other non-linear functions include tanh and sigmoid.

Pooling, which can also be referred to as sub-sampling or down-sampling, can reduce the dimensionality of a feature map while retaining the most important information. Pooling can include, for example, taking a region of values in the matrix of a feature map (e.g., a 2×2 neighborhood, or a neighborhood of another size), and determining a maximum value across the values in the region. Alternatively, average, sum, or another function can be used as the pooling function.

Pooling can be used to progressively reduce the spatial size of the input representation. For example, pooling can make the input representations (e.g., the feature dimension) smaller and more manageable. As another example, pooling can reduce the number of parameters and computations that need to be performed by the neural network. As another example, pooling can make the neural network invariant to small transformations, distortions, or translations in the input image. That is, a small distortion in the input is not likely to change the output of the pooling, since the maximum (or average, or sum, or some other operation) is taken in a local neighborhood. As a further example, pooling can assist in determining an almost scale invariant representation of the image (referred to as an equivariant representation). This means that an object can be detected in an image no matter where the object is located within the image.

As illustrated by the example of FIG. 4, a convolutional neural network can include multiple convolution layers, with each layer refining the features extracted by a previous layer. Each convolution layer may be, but need not be, followed by pooling. The output of a combination of these layers represent high-level features of the input image, such as the presence of certain shapes, colors, textures, gradients, and so on.

To turn these feature maps into a classification, a convolutional neural network can include one or more fully-connected layers. A Multi-Layer Perceptron that uses, for example, a softmax activation function or another logistic function, can be used after a fully-connected layer. A fully-connected layer can classify the input image into various classes based on training data. For example, the convolutional neural network of FIG. 4 was trained to recognize dogs, cats, boats, and birds, and can classify an input image as including one of these classes.

Apart from classification, a fully-connected layer in a convolutional neural network might also provide an inexpensive (in computational and/or data storage terms) way to learn non-linear combinations of the extracted features. The features extracted by the convolution and pooling layers may be good for making a classification, but a combination of the features may be better.

In the example of FIG. 4, the sum of the output predictions 414 is 1, due to the output layer using the softmax activation function. The softmax function takes a vector of arbitrary real-valued scores and compresses these values into a vector of values between zero and one that add up to one.

Research has found that the more convolution steps a neural network has, the more features the network will be able to learn to recognize. For example, in an image classification example, in a first layer, the neural network may learn to detect edges from the raw pixels, then in a second layer use the edges to detect shapes, and in a third layer, the neural network may be able to use the shapes to determine higher-level features, such as facial shapes, in higher layers.

In training a convolutional neural network, parameters such as the number of filters, the filter sizes, and the organization of the layers remain unchanged. During training, only the values of the filter matrices and connection weights are changed. Once trained, a neural network includes the weights determined during the training and a set of instructions describing the computation to be executed at each layer and/or node of the network. In some examples, the number of weights can be on the order of 5 million to 100 million. In some examples, a weight value can be represented using a 32-bit number, in which case 5 million to 100 million weights can require about 20 megabytes (NB) to 400 MB to store. In some examples, the number of weights can be as few as 1.5 million.

Operation of a neural network (e.g., conducting inference) involves fetching input data or input activations, executing multiply-and-accumulate operations in parallel for each node in a layer, and providing output activations. Optimum performance of a neural network, measured by accuracy and/or response time, can be achieved when a hardware architecture is capable of highly parallelized computations. Central Processing Units (CPUs), which can also be referred to as general purpose processing units, can have multiple cores, (e.g., 2 to 64 or more cores) and can increase parallelism through use of multiple execution threads. CPU cores, however, tend to be optimized for sequential processing. For example, a computation engine (e.g., an arithmetic logic unit (ALU)) of a core obtains operands from memory and writes a result to memory, such that memory operations are required for sequential computations. In this example, each memory operation can require management by control logic of the CPU. For this and other reasons, CPUs tend to have slow response times when performing inference for a neural network.

In contrast to CPUs, Graphics Processing Units (GPUs) achieve parallelism by having thousands of small and efficient cores, configured specifically for conducting parallel computations. GPUs thus can achieve far better performance than a CPU when executing a neural network. Individual GPU computation engines, however, can still be primarily sequential in nature, such that memory operations are required for the outputs of one computation engine to be provided to the inputs of another.

Special-purpose neural network processors can achieve better performance than both CPUs and GPUs when executing a neural network. Neural network processors can employ a spatial architecture, in which computation engines form processing chains and can pass data directly from one computation engine to another. This can significantly reduce the number of memory transactions needed to conduct inference. In some examples, neural network processors can also include an on-chip buffer that can store values read from processor memory, and that can distribute values to multiple computation engines in the neural network processor. The computation engines can further include a small, local register file (e.g., a small memory) for storing intermediate results. Having an on-chip memory hierarchy can improve the efficiency of the operation of a neural network by reducing memory latencies.

Figure 5:
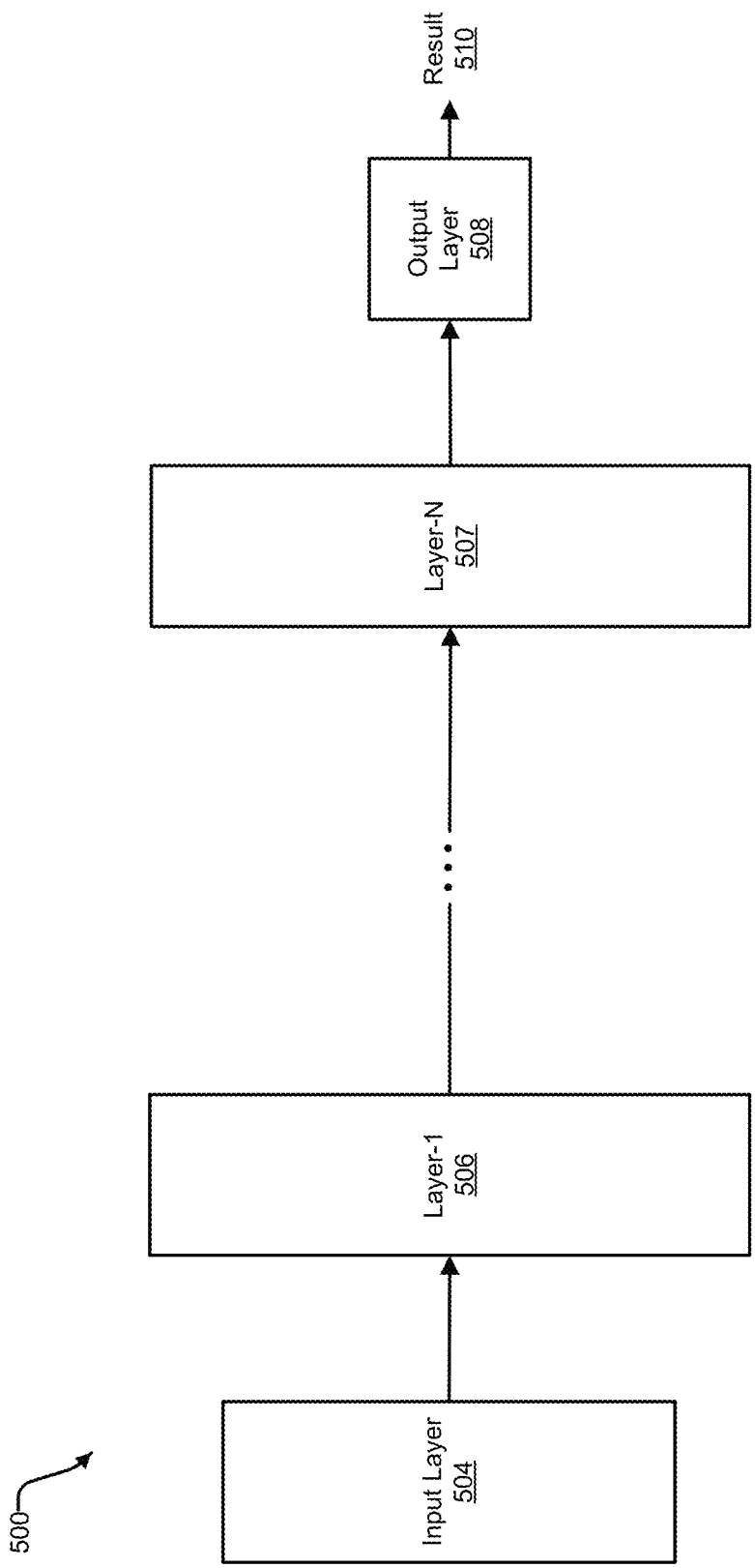
FIG. 5 illustrates a simplified example of the organization for a neural network.

For some neural networks, conducting inference requires a neural network processor to execute the same number of computations, regardless of the input. FIG. 5 illustrates a simplified example of the organization for a neural network 500. The neural network 500 of this example includes an input layer 504, a first hidden layer, Layer-1 506, a second hidden layer, Layer-2 507, and an output layer 508, which produces a result 510. The layers in the neural network 500 can, for example, perform a convolution. Alternatively, or additionally, the layers can be fully connected layers, sparsely connect, and/or can include recurrent weights.

In the example of FIG. 5, a neural network processor that executes the neural network 500 will perform the computations for the input layer 504, Layer-1 506, Layer-2 507, and the output layer 508 each time the neural network processor is provided input data and instructed to execute the neural network. This will be the case even if, for example, the output of Layer-1 506 may provide a reasonable result. For example, for one input data, the results from Layer-1 506 can indicate with 95% certainty that the input data is an image of a dog. In this example, the output of Layer-1 506 can be sufficient. As a counter-example, for another input data, the results from Layer-1 506 can indicate 65% certainty that the input data is an image of a dog. In this example, the result is not sufficient, and execution of the neural network 500 should process to Layer-2 507.

Figure 6:
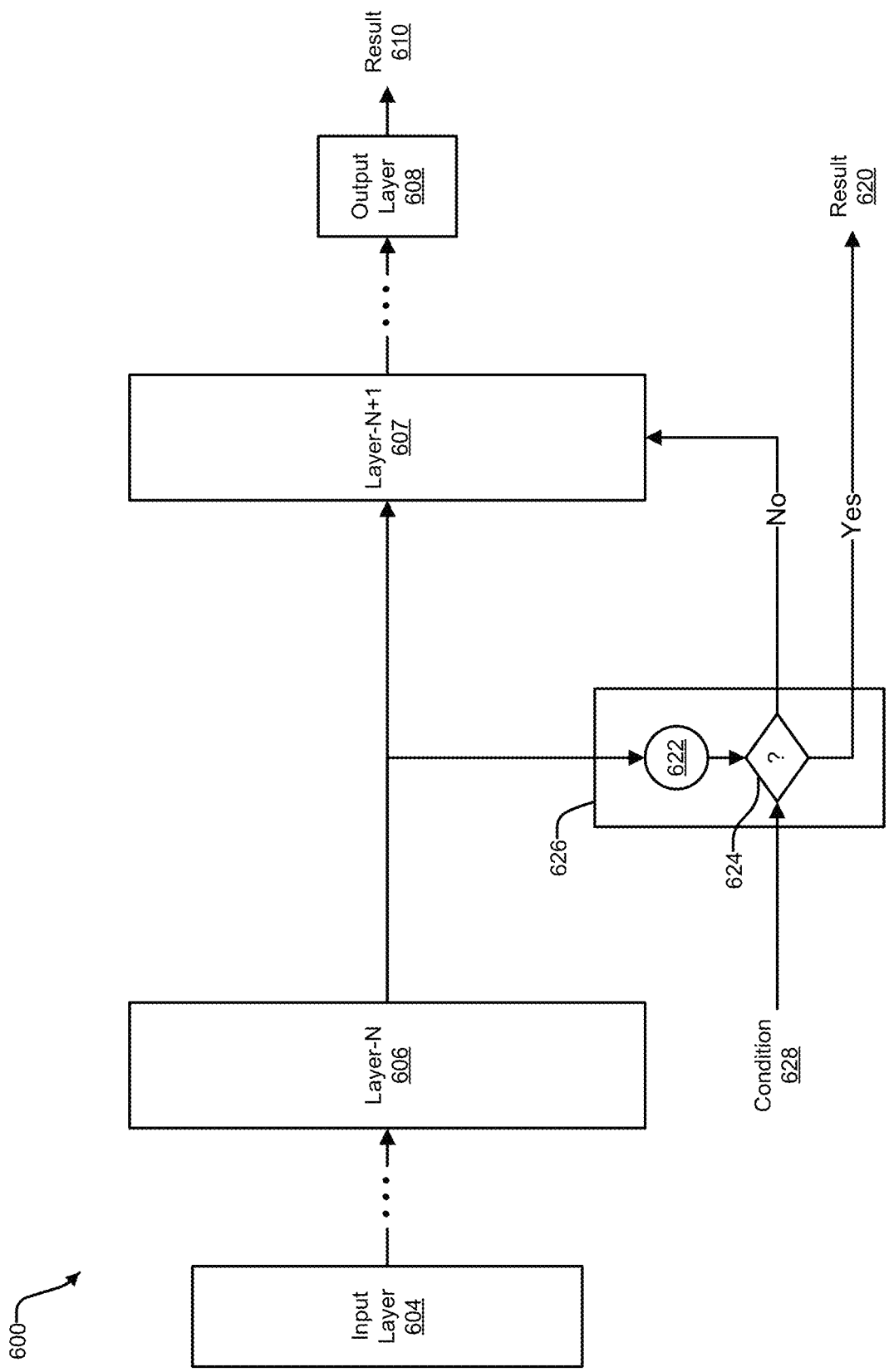
FIG. 6 illustrates a simplified example of a neural network that includes a conditional layer.

Some neural networks can be configured to take advantage of the possibility that an intermediate result might be sufficient, such that not all layers of the neural network need to be executed. FIG. 6 illustrates a simplified example of a neural network 600. In this example, the neural network 600 includes an input layer 604, a first hidden layer (Layer-N 606), a second hidden layer (Layer-N+1 607), and an output layer 608, which can produce a result 610. In this example, Layer-N+1 607 is a layer that inter-mediate immediately follows Layer-N 606, and receives, as inputs, the outputs of Layer-N 606. In various examples, the neural network 600 can include additional layers between the input layer 604 and Layer-N 606, and/or between Layer-N+1 607 and the output layer 608. In various examples, the layers in the example neural network 600 can include convolutional operations, non-linearity, and or pooling. Alternatively or additionally, the layers can be fully connected, sparsely connected, and/or can include recurrent weights.

The example neural network 600 also includes intermediate operations between Layer-N 606 and Layer-N+1 607, which are grouped into what is referred to herein as a conditional layer 626. In various implementations, the conditional layer 626 can include a function 622 for computing an intermediate result from the outputs of Layer-N 606. Execution of the conditional layer 626 can further include testing 624 the result computed by the function 622 against a condition 628. When testing 624 determines that the condition 628 is not satisfied by the result, execution of the neural network proceeds with Layer-N+1 607 and continues to the output layer 608. When testing 624 determines that the condition 628 is satisfied, in this example, further execution of the neural network 600 can stop, such that Layer-N+1 607 and output layer 608 are not executed. Additionally, the result computed by the function 622 can be used as the final result 620, instead of a result 610 that would be computed by the output layer 608.

The function 622 used in the conditional layer 626 can include a logistic function, such as softmax. The softmax function combines the values in a vector of arbitrary values to a vector of values in the range of (0, 1) that add up to 1. The output of the softmax function can be used to represent a categorical distribution. In the example of FIG. 6, some or all of the outputs of Layer-N 606 can be input into softmax to produce a result. The outputs of Layer-N 606 are provided to Layer-N+1 607 when Layer-N+1 607 is executed. In various examples, other logistic functions can be used.

The condition 628 can describe circumstances under which the result of the function 622 can serve as the final result for a set of input data. For example, the condition 628 can include a test value, against which the result is tested. Additionally, in some implementations, the condition 628 can include a test that is to be applied at the testing 624 step. For example, the test can be to compare the result against the test value, and when the result is greater than (or less than, or equal to, or not equal to, or some other comparison) the test value, then the condition is met. For example, the condition 628 can provide a test value of 90%, and indicate that, when the result indicates a greater than 90% probability, then the condition 628 is satisfied.

In some examples, the function 622 outputs a set of values. For example, softmax can output a vector. In these examples, the condition 628 can be that one or more values from the set of values should meet a condition. For example, the five largest values from the set (or the two largest, or seven largest, or some other number of largest values) can be summed, and the testing 624 can determine whether the sum meets the condition. For example, the testing 624 can determine whether the sum is greater than a threshold value. In these and other examples, the condition can be less stringent than when only the largest value from the set is tested against the condition.

The condition 628, including a test value and possibly also a test definition, can be part of the data of the neural network (along with weight values and instructions). For example, the test definition can be determined at the time the structure of the neural network is determined. In some examples, the condition 628 can be determined during training, for example by adding a check between some or all layers of the neural network to see if there is a frequent occurrence of good results after any of the layers being tested (where "good" means the result is a strong indicator of an answer (e.g., 95% probably of a match) and accurate). In these examples, the test value can be determined from the training data. In some examples, the test value and/or the test can be specified by the neural network architect or an engineer tasked with training the neural network.

In some examples, the test value and/or the test being applied can be specified separately from the definition of the neural network. For example, a neural network processor can include a register or set of registers which can store the test value, a test, and/or to which conditional layer 626 the test value and/or test applies. In some examples, the neural network processor can include a test value and/or test for each conditional layer 626. In some examples, the neural network processor can include a test value and/or test for all conditional layers. In some examples, the neural network processor can include separate test values and/or tests for each task the neural network is trained to perform.

The example neural network 600 of FIG. 6 includes one conditional layer 626. Other example neural networks can include multiple conditional layers. For example, a neural network with 100 layers can include a conditional layer every ten layers. In some examples, the placement of the conditional layers can be determined from the number of layers in the neural network and/or the number of computations in each layer. In some examples, the placement of the conditional layers can be determined from the training data. For example, some training data may result in an acceptable result being output after 5 layers of 20 layers, while another set of training data may result in an acceptable result being output after 15 layers of 20 layers. In this example, a conditional layer can be placed after layer 5 and after layer 15.

Figure 7:
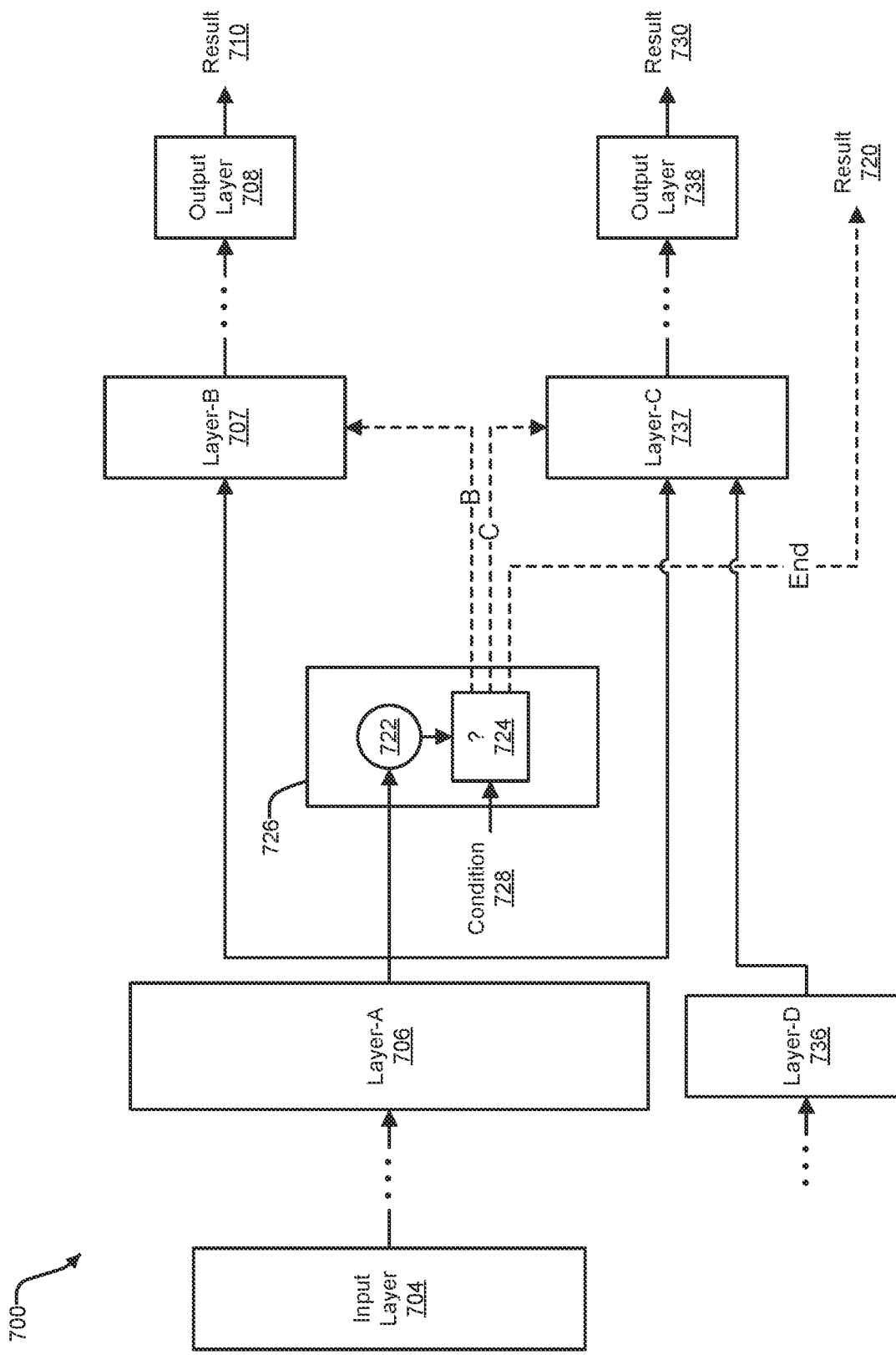
FIG. 7 illustrates an example of a neural network that includes a conditional layer.

In various examples, conditional layers can be used not only to determine whether a layer has produce a useable result, but also to change the subsequent operation of the neural network. FIG. 7 illustrates an example of a neural network 700 that includes a conditional layer 726 that can be used to change the operational flow of the neural network 700. The example neural network 700 includes an input layer 704 and a first hidden layer (Layer-A 706), a second hidden layer (Layer-B 707), a third hidden layer (Layer-C 737), a fourth hidden layer (Layer-D 736), a first output layer 708, a second output layer 738, and a conditional layer 726.

In the example of FIG. 7, Layer-B 707 and Layer C 737 illustrate two alternative execution flows or branches that the neural network can take depending on an outcome determined at the conditional layer 726. In the illustrated example, Layer-B 707 can lead to the first output layer 708 being executed to output a first result 710, and Layer-C 737 can lead to the second output layer 738 being executed to output a second result 730. The second result 730 can be different from the first result 710. In some examples, only the branch including Layer-B 707 or the branch including Layer-C 737 is executed. In some examples, both branches are executed. In various examples, the neural network 700 can include additional alternative execution flows that are selected by the conditional layer 726.

Also in the example of FIG. 7, Layer-C 737 illustrates that more than one execution flow can lead to Layer-C 737. For example, Layer-C 737 can follow the execution of Layer-D 736. Layer-D 736, in this example, may be an alternative execute path to Layer-A 706, and/or may be a layer that is earlier or later than Layer-A 706 in the neural network 700. Additional examples of multiple paths to one or more layers are discussed below.

In the example neural network 700, the outputs of Layer-A 706 are input into a function 722 that computes a result for Layer-A 706. Execution of the conditional layer 726 can further include testing 724 the result against a condition 728. In some examples, the testing 724 can determine that Layer-B 707 is to be the next layer to execute, or that Layer-C 737 is to be the next layer to be executed. In this example, the testing 724 can operate similar to an "if-else" conditional construct, with, for example, Layer-B 707 being executed when the "if" test is satisfied, and Layer-C 737 being executed when the "else" clause results. In other examples, an "if-then-else" construct can be implemented, in which additional layers, not illustrated here, can be selected by the testing 724 for execution.

In some examples, the testing 724 can include determining whether the result computed by the function 722 can be used as a final result 720. For example, when the result is greater than a test value, which can be provided by the condition 728, then the result from the function 722 can be used as a final result 720, instead of a result 710 computed by the first output layer 708 or a result 730 computed by the second output layer 738. Outputting a result 720 from the conditional layer 726 is similar to a "return n" construct for exiting from a subroutine, with n being the result 720.

In some examples, the condition 728 can specify the layers at which to proceed from the conditional layer 726. For example, the condition 728 can identify Layer-B 707 as the next layer when the condition is met, and Layer-C 737 as the next layer when the layer is not met. The condition 728 can identify the layers using, for example, a numerical identifier for the layers or a memory address for the layers, among other identification methods.

In some examples, the condition 728 can instruct the testing 724 to take the best path, based on the result computed by the function 722. The best path can be indicated, for example, by probabilities computed by the function 722. For example, when the function 722 determines a 65% probability that an input image is of a dog, the best path can be Layer-B 707; otherwise, the path to Layer-C 737 should be taken. As another example, the function 722 may determine a 35% probability that an input image is of a dog, and a 30% probability that the input image is of a cat. In this example, the condition 728 may indicate that these probabilities are too low to be sufficiently certain, and that both branches should be taken. As another example, when the testing 724 output is uncertain, the condition 728 can provide that one or the other branch is the default path. An uncertain result can be specified, for example, as the result from the function 722 not being greater than an upper bound and also not being less than a lower bound. In other examples, other conditions can be specified to select one branch or the other branch, or both branches.

The neural network configuration illustrated in FIG. 7 can be used for various purposes. For example, the example neural network 700 can be used to produce more accurate results, to reduce the number of computations that need to be executed for certain inputs, to enable the neural network 700 to perform multiple tasks or more complex tasks, or for another reason. For example, one branch may be optimized for recognizing dogs, while the other branch is optimized for recognizing cats. As another example, one branch may be shorter (meaning, may have fewer layers) and thus requires fewer computations to produce a result. As another example, the condition 728 may different results for a set of input data. For example, for a set of input data, one branch can compute steering instructions for a self-driving car while another branch simultaneously computes acceleration instructions for the car.

In various examples, conditional layers can be used to construct neural networks branches, loops, and conditional structures. FIGS. 8A-8D illustrate several examples of neural network structures using conditional layers. The examples illustrated in FIG. 8A-8D can occur in any type of neural network (e.g., MLP networks, convolutional neural networks, etc.). These examples can further occur more than once in a neural network. The individual examples can also occur in various combinations in the same neural network.

The example structures can be used for various purposes, such as building neural networks with parts that are optimized for making different decisions (e.g., one branch that is optimized for recognizing cats and another that is optimized for recognizing dogs) and/or with parts that can make different decisions for the same input data, possibly at the same time (e.g., to enable a robot to talk and make gestures at the same time). In some examples, the example structures can be used to, for example, re-use layers or to have fewer layers in some branches than in others. Layers can be re-used, for example, to re-process data that has not produced enough information. Shorter branches (e.g., having fewer layers) can be selected when the neural network determines that data needs less processing. In these and other examples, neural networks can be built more compactly, more optimally, and/or with more capabilities.

Figure 8A:
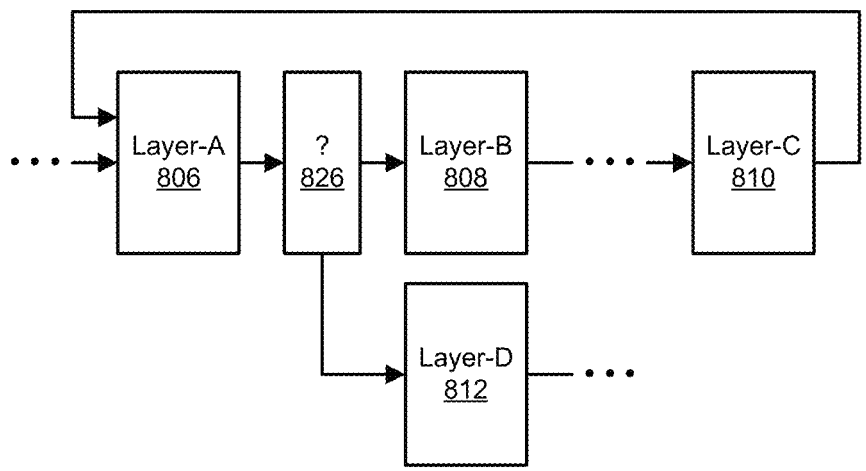
FIGS. 8A-8D illustrate several examples of neural network structures using conditional layers.

The example of FIG. 8A illustrates a first example structure that includes a conditional layer 826. In this example, a "test first" structure, similar to a "for" loop or a "while" loop, is illustrated. A first layer, Layer-A 806 is followed by the conditional layer 826. The conditional layer 826 can select between a Layer-B 808 or a Layer-D 812. When Layer-B 808 is selected, the execution flow proceeds through some number of layers to a Layer-C 810. From Layer-C 810, the execution flow returns to Layer-A 806. In other examples, the execution flow can proceed from Layer-B 808 directly to Layer-A 806. Execution flow, in these examples, means that the outputs of Layer-C 810 are provided as inputs to Layer-A 806, with Layer-A 806 then being the next layer that is executed. When the conditional layer 826 determines that Layer-B 808 is to be executed again, then Layer-B 808 proceeds with the outputs of Layer-A 806. In this example, the execution flow loops from Layer-A 806 to Layer-B 808 to Layer-C 810 until the conditional layer 826 determines to exit the loop, at which point the execution flow proceeds to Layer-D 812.

Figure 8B:
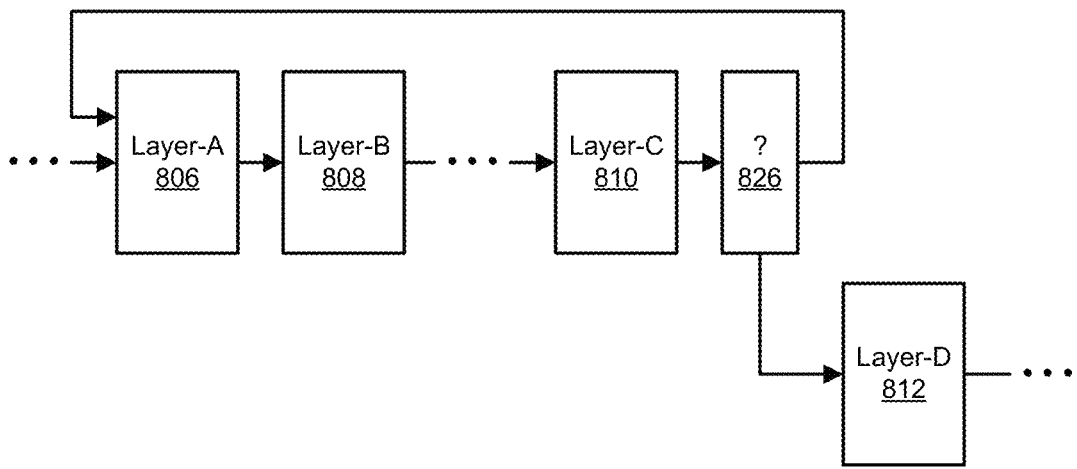

FIG. 8B illustrates a second example structure that includes a conditional layer 826. In this example, a "test last" structure is illustrated, which is similar to a "do-while" loop construct. In this example, execution flow starts at Layer-A 806, then proceeds through Layer-B 808 and Layer-C 810. Layer-C 810 is followed by a conditional layer 826, which can determine to return to Layer-A 806 or exit the loop to Layer-D 812. In contrast to the example of FIG. 8A, where Layer-B 808 and Layer-C 810 may not be executed, in the example of FIG. 8B, Layer-B 808 and Layer-C 810 will be executed before the conditional layer 826 is reached.

The loop structures illustrates in FIGS. 8A and 8B can be used, for example, to refine the data being processed. For example, in audio processing, the layers in the loop can be executing noise filtering, and the data may be reprocessed until the noise reduction has reached a desired level.

In some examples, the conditional layer 826 used in loop structures can include memory, such that the conditional layer 826 can store a value that may be updated on each iteration of the loop. For example, the conditional layer 826 can include a counter that the conditional layer 826 can use to determine to exit the loop. As another example, the conditional layer 826 can store the result computed from the outputs of the previous layer to use to compare against on the next iteration of the loop.

Figure 8C:
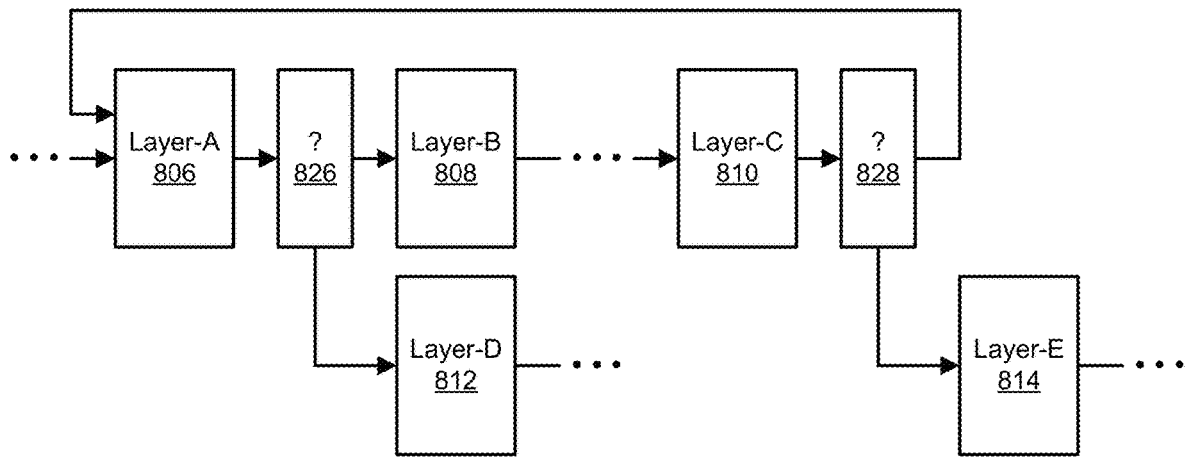

FIG. 8C illustrates a third example structure that includes two conditional layers. In this example, the first conditional layer 826 provides a loop structure, and the second conditional layer 828 provides an exit from the loop structure, similar to a "break" or "continue" construct. In this example, execution flow begins with Layer-A 806 and proceeds to the first conditional layer 826. The first conditional layer can determine to proceed to Layer-B 808 or to Layer-D 812. From Layer-B 808, the execution flow can proceed through some number of layers to Layer-C 810. Layer-C 810 is followed by the second conditional layer 828, which can determine to return the execution flow to Layer-A 806 or to exit the loop and proceed with Layer-E 814. In other examples, additional layers may follow the second conditional layer 828 before the execution flow returns to Layer-A 806.

The example of FIG. 8C illustrates use of conditional layers to test for conditions at different points in the execution flow. The conditional layers can be testing for the same condition (e.g., is the result of the previous layer above a threshold value) or for different conditions. An example of the latter case can be to avoid excessive processing of the data. For example, the first condition may be testing for noise reduction in an audio signal, and can dictate that the loop be repeated so long as the noise reduction is above a threshold, while the second condition is testing for the strength of the audio signal, and can exit the loop if the strength falls below a threshold.

Figure 8D:
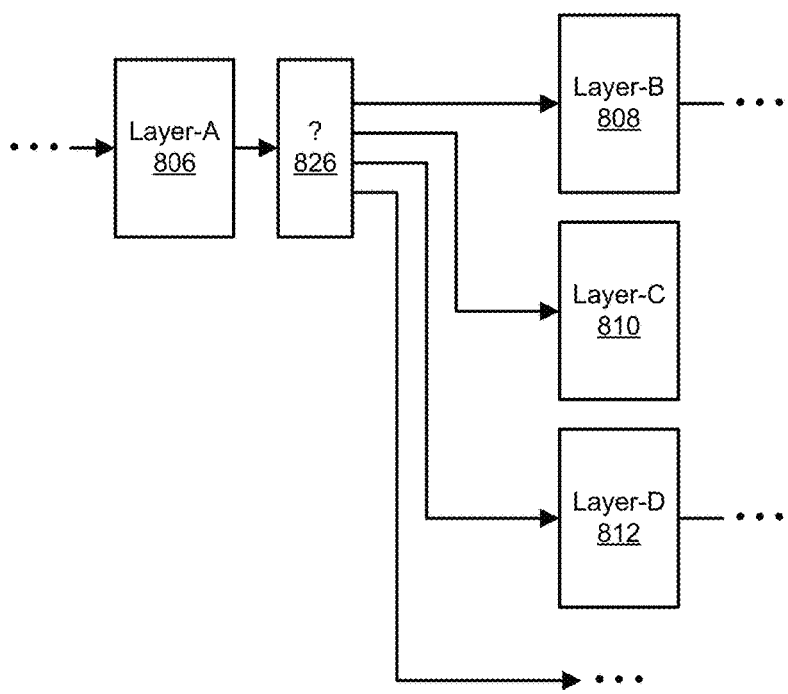

FIG. 8D illustrates a fourth example structure with a conditional layer 826. This example illustrates a "case" or "switch" structure, in which multiple paths can be taken from the conditional layer 826. In this example, Layer-A 806 can be followed by one of Layer-B 808, Layer-C 810, Layer-D 812, or another layer, depending on the decision made at the conditional layer 826.

The structure illustrated in FIG. 8D can be constructed similar to an extended "if-then-else" structure, in which the conditional layer 826 tests and possibly also computes multiple conditions (e.g., "if (condition is B) then Layer-B 808, else if (condition is C) then Layer-C 810, else if (condition is D), then Layer-D, else another layer"). Alternatively, the conditional layer 826 can compute one condition, and make a determination from the one condition. For example, the conditional layer 826 can compute a value, and use the value to select the next layer, similar to a multiplexor.

In various implementations, a neural network processor can be constructed that can make use of conditional layers in a neural network. As noted above, neural network processor implementations are configured to execute each layer in a neural network successively, from the input layer to the output layer. Thus, without support for the conditional layer, a neural network processor may not be able to execute neural network such as those illustrated in FIGS. 6, 7, and 8A-8D.

Figure 9:
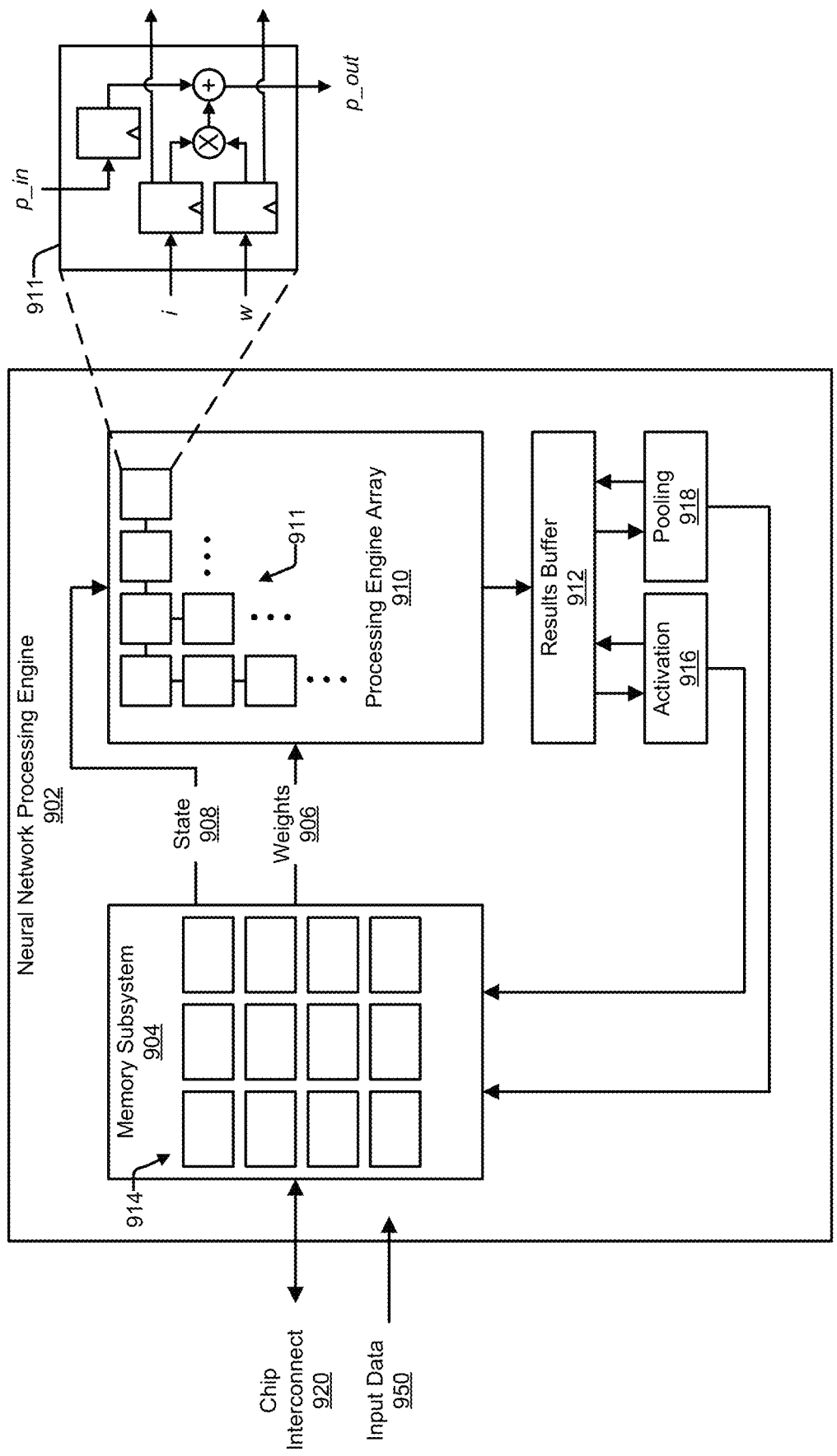
FIG. 9 illustrates an example of a neural network processing engine that can be used to execute a neural network.

FIG. 9 illustrates an example of a neural network processing engine 902 of a neural network processor. In various implementations, the neural network processing engine 902, for a set of input data, can execute a neural network to perform a task the neural network was trained for (e.g., conduct inference), including executing conditional layers. In various implementations, the example neural network processing engine 902 is an integrated circuit component of a neural network processor. The neural network processor can have other integrated circuit components, including additional neural network processing engines. In various implementations, the neural network processing engine 902 can include a memory subsystem 904 and a processing engine array 910. When in operation (e.g., when computing a result for a set of input data 950), the processing engine array 910 can read weight 906 and state 908 values from the memory subsystem 904. The processing engine array 910 can output computation results to a results buffer 912. In some cases, the example neural network processing engine 902 can perform an activation function (using an activation 916 block) and/or pooling (using a pooling 918 block) on the results from the processing engine array 910, before the results are written to the memory subsystem 904.

Weights 906, in this example, are the weight values for a neural network. In various implementations, the weights 906 are post-training weights, meaning that values for the weights 906 were previously determined. State 908, in this example, can include input data 950 when a computation begins, as well as intermediate values that reflect an in-progress computation. State 908, for example, can include partial sums determined by the processing engine array 910. State 908 can also include instructions for the processing engine array 910, where the instructions may be associated with a particular layer. The instructions can, for example, instruct the processing engine array 910, and possibly also the activation 916 and/or pooling 918 blocks, to execute a certain computation. The weights 906 and the state 908 can be read from the memory subsystem 904 for operating on by the processing engine array 910. In some examples, the memory subsystem can also include a separate memory or buffer for instructions.

In various implementations, the memory subsystem 904 can include multiple memory banks 914. In these implementations, each memory bank 914 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 914. For example, each memory bank can have at least one read channel and may have at least one separate write channel that can be used at the same time. In these examples, the memory subsystem 904 can permit simultaneous access to the read or write channels of multiple memory banks. As another example, the memory subsystem 904 can include arbitration logic such that arbitration between, for example, the outputs of multiple memory banks 914 can result in more than one memory bank's output being used. In these and other examples, though globally managed by the memory subsystem 904, each memory bank can be operated independently of any other.

Having the memory banks 914 be independently accessible can increase the efficiency of the neural network processing engine 902. For example, weights 906 and state 908 can be simultaneously read and provided to each row of the processing engine array 910, so that the entire processing engine array 910 can be in use in one clock cycle. As another example, weights 906 and state 908 can be read at the same time that intermediate results are written to the memory subsystem 904. In contrast, a single memory, while still able to provide weights 906 and state 908 to the processing engine array 910 faster than off-chip memory, may be able to service only one read or write at a time. With a single memory, multiple clock cycles can be required, for example, to read weights for each row of the processing engine array 910 before the processing engine array 910 can be started.

In various implementations, the memory subsystem 904 can be configured to simultaneously service multiple clients, including the processing engine array 910, the activation 916 block, the pooling 918 block, and any external clients that access the memory subsystem 904 over a chip interconnect 920. In some implementations, being able to service multiple clients can mean that the memory subsystem 904 has at least as many memory banks as there are clients. In some cases, each row of the processing engine array 910 can count as a separate read client. In these cases, weights 906 and state 908 can be stored separately, and thus require two reads, or can be concatenated and stored together, thus requiring one read. In some cases, each column of the processing engine array 910 can output an intermediate value, such that each column can count as a separate write client. In some cases, output from the processing engine array 910 can be written into the memory banks 914 that can then subsequently provide input data for the processing engine array 910. The memory banks 914 can be implemented, for example, using static random access memory (SRAM).

In various implementations, the memory subsystem 904 can include control logic. The control logic can, for example, keep track of the address spaces of each of the memory banks 914, identify memory banks 914 to read from or write to, and/or move data between memory banks 914, if needed. In some implementations, the memory subsystem 904 can include multiplexors for selecting which memory bank to output to a particular client and/or to receive input from a particular client. In these implementations, the control logic can generate select signals for the multiplexors, which can enable some or all of the memory banks 914 to service each client. In some implementations, memory banks 914 can be hardwired to particular clients. For example, a set of memory banks 914 can be hardwired to provide weights 906 and state 908 to the rows of the processing engine array 910. In these examples, the control logic can move data between memory banks 914, for example, to move intermediate results from the memory banks 914 to which the intermediate results are written, to the memory banks 914 from which the intermediate results will be read for the next round of computation.

The processing engine array 910 is the computation matrix of the neural network processing engine 902. The processing engine array 910 can, for example, execute parallel integration, convolution, correlation, and/or matrix multiplication, among other things. The processing engine array 910 includes multiple processing engines 911, arranged in rows and columns, such that results output by one processing engine 911 can be input directly into another processing engine 911. Processing engines 911 that are not on the outside edges of the processing engine array 910 thus can receive data to operate on from other processing engines 911, rather than from the memory subsystem 904.

In various examples, the processing engine array 910 uses systolic execution, in which data arrives at each processing engine 911 from different directions at regular intervals. In some examples, input data can flow into the processing engine array 910 from the left and weight values can be loaded at the top. In some examples weights and input data can flow from the left and partial sums can flow from top to bottom. In these and other examples, a multiply-and-accumulate operation moves through the processing engine array 910 as a diagonal wave front, with data moving to the right and down across the array. Control signals can be input at the left at the same time as weights 906, and can flow across and down along with the computation.

In various implementations, the number of columns in the processing engine array 910 determines the computational capacity of the processing engine array 910, and the number of rows determines the required memory bandwidth for achieving maximum utilization of the processing engine array 910. The processing engine array 910 can have, for example, 64 columns and 256 rows, or some other number of columns and rows.

An example of a processing engine 911 is illustrated in FIG. 9 in an inset diagram. As illustrated by this example, a processing engine 911 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 911.

In the illustrated example, an input from above can include a partial sum, p_in, provided either from another processing engine 911 or from a previous round of computation by the processing engine array 910. When starting a computation for a new set of input data, the top row of the processing engine array 910 can receive a fixed value for p_in, such as zero. As illustrated by this example, i and w are multiplied together and the result is summed with p_in to produce a new partial sum, p_out, which can be input into another processing engine 911. Various other implementations of the processing engine 911 are possible.

Outputs from the last row in the processing engine array 910 can be temporarily stored in the results buffer 912. The results can be intermediate results, which can be written to the memory banks 914 to be provided to the processing engine array 910 for additional computation. Alternatively, the results can be final results, which, once written to the memory banks 914 can be read from the memory subsystem 904 over the chip interconnect 920, to be output by the system.

In some implementations, the neural network processing engine 902 includes an activation 916 block. In these implementations, the activation 916 block can combine the results from the processing engine array 910 into one or more output activations. For example, for a convolutional neural network, convolutions from multiple channels can be summed to produce an output activation for a single channel. In other examples, accumulating results from one or more columns in the processing engine array 910 may be needed to produce an output activation for a single node in the neural network. In some examples, activation 916 block can be bypassed.

In some implementations, the neural network processing engine 902 can include a pooling 918 block. Pooling is the combining of outputs of a cluster of nodes from a layer of a neural network. The combined output can be provided to the next layer. Combining can include for example, computing a maximum value, a minimum value, an average value, a median value, or some other value determined from the outputs of the cluster of nodes. In various examples, the pooling 918 can be selectively activated, as needed for any particular neural network.

In various implementations, instructions provided to the processing engine array 910 can include instructions for executing a conditional layer, including instructions that configure the processing engine array 910 to compute a result from the outputs of the most recent layer that was executed, and testing the result against a condition. For example, an instruction included in state 908 read from the memory subsystem 904 can configure the processing engine array 910 to read the outputs of preceding layer, and to compute a result from these outputs. In this example, the preceding layer is a hidden layer or any other layer other than the output layer. Also in this example, the processing engine array 910 can compute the result using a particular logistic function, which may be identified by an instruction. As a further example, the same instruction or different instruction can include a condition against which to compare the result. In this example, the instruction can configure the processing engine array 910 to test the result to determine whether the result meets the condition. The condition can, for example, call for testing the result against a test value, where the test is to see whether the result is greater than, less than, equal to, and/or not equal to the test value, or to conduct another type of comparison. In some examples, the processing engine array 910 can compute the result and test the condition at the same time. In some examples, the processing engine array 910 can compute the result directly from intermediate results being computed by the processing engine array 910. In some examples, the processing engine array 910 can compute the result and then store the result in the memory subsystem 904, and then read the result to test the condition. In these and other examples, once the processing engine array 910 has tested the result against the condition, the processing engine array 910 can write the outcome of the test to the memory subsystem 904, or to a register in the neural network processing engine 902, or to a storage location outside of the neural network processing engine 902.

In some examples, the pooling 918 block can be used to assist in executing a conditional layer. For example, when the outputs of the preceding layer are computed by the processing engine array 910, the pooling 918 block can be configured to compute a result from the outputs. In this example, the outputs and the result can both be written to the memory subsystem 904. Also in this example, the result output by the pooling 918 can be input to the processing engine array 910 for the processing engine array 910 to test the result against a condition.

In some examples, the activation 916 block can be configured to test the result against the condition. For example, the activation 916 block can be configured such that, when the result is output from the processing engine array 910, the activation 916 block can test the result against the condition. In this example, the activation 916 block can write an outcome of the test to the memory subsystem 904 or to a register.

In some examples, the pooling 918 block can be used when the condition requires manipulating multiple values. For example, the result may include a set of values, such as may be included in a vector computed by softmax. In this example, cascading sub-blocks in the pooling 918 block can compare the values in the set against one another to identify the largest two, five, seven, or some other number of values. A final block in the cascade can compute a sum of the largest values, and then compare the sum against a test value. In this example, the result of the comparison determines whether the condition has or has not been met.

In the various examples discussed above, execution of the conditional layer completes with a value written to the memory subsystem 904 or to a register, which indicates the outcome of testing the condition. Alternatively or additionally, the neural network processing engine 902 can write the value to a storage location outside of the neural network processing engine 902, such as in processor memory. In these and other examples, the neural network processing engine 902 can then wait for further instructions. For example, the neural network processing engine 902 may wait for input data 950 and an instruction to continue processing. In this example, the input data 950 can be a set of weights for the next layer that the neural network processing engine 902 is to execute. Alternatively or additionally, the input data 950 can include an instruction for the neural network processing engine 902 to start a new inference, and the input data 950 can include the data upon which to operate.

In some examples, in addition to or instead of writing a value indicating the outcome of the condition, the neural network processing engine 902 can determine the next action to take. For example, the conditional instruction can include a pointer, memory address, or other identifier for the next layer to execute when the condition is met. In this example, the conditional instruction can also include an identifier for a layer to execute when the condition is not met, or else indicate that the next sequential layer should be executed. In this example, the neural network processing engine 902 may be able to being executing the layer identified by the conditional instruction. For example, the weights for the identified layer may already be present in the memory subsystem 904. Alternatively, the neural network processing engine 902 may be able to request that the appropriate weights be loaded into the memory subsystem 904.

In some examples, the neural network processing engine 902 may be instructed to stop in-progress computations, and reset to a start state. This may occur, for example, when the condition is met and the neural network processing engine 902 is being instructed to not continue with the current inference. To terminate an in-progress computation, the neural network processing engine 902 can, for example, flush all values in the processing engine array 910 and discard the outputs. As a further example, the neural network processing engine 902 can delete values from the memory subsystem 904 and/or move values to be ready to start a new inference. In some examples, the neural network processing engine 902 can immediately begin a new inference on input data 950 that is waiting to be processed.

Input data 950 can arrive over the chip interconnect 920. The chip interconnect 920 can connect the neural network processing engine 902 to other components of a neural network processor, such as a Direct Memory Access (DMA) engine that can obtain input data 950 from an Input/Output (I/O) device, a storage drive, or a network interface. The input data 950 can be, for example one-dimensional data, such as a character string or numerical sequence, or two-dimensional data, such as an array of pixel values for an image or frequency and amplitude values over time for an audio signal. In some examples, the input data 950 can be three-dimensional, as may be the case with, for example, the situational information used by a self-driving car. In some implementations, the memory subsystem 904 can include a separate buffer for the input data 950. In some implementations, the input data 950 can be stored in the memory banks 914 along with the weights 906.

In various implementations, the weights 906 stored in the memory subsystem 904 can have been determined by training the neural network to perform one or more tasks. The input data 950 can include an instruction indicating the task to perform (e.g., image processing, speech recognition, machine translation, etc.). In various implementations, the neural network processing engine 902 is configured for conducting inference (e.g., performing a task), rather than for training of the neural network. In some implementations, the neural network processing engine 902 can be used for training, though perhaps with assistance from software to update the stored weights 906.

In various implementations, the memory subsystem 904 can include enough memory to store both intermediate results and all of the weight values for a neural network. The memory subsystem 904 should have, at a minimum, enough memory in the memory subsystem 904 to store intermediate results, but in many cases the memory subsystem 904 can include many more memory banks 914 than are needed to store just intermediate results. This additional space can be used to store all of the weight values for a neural network. For example, a neural network may have 1.5 million weights, which, when each is represented by 32 bits, can require about 6 MB of memory. Intermediate results can require, for example, 10 MB of storage space, at most. On-chip memory of 20 MB is a reasonable size, and, in the preceding example, can readily accommodate the weight values, intermediate results, and any other data that the neural network processing engine 902 can need during operation.

Figure 10:
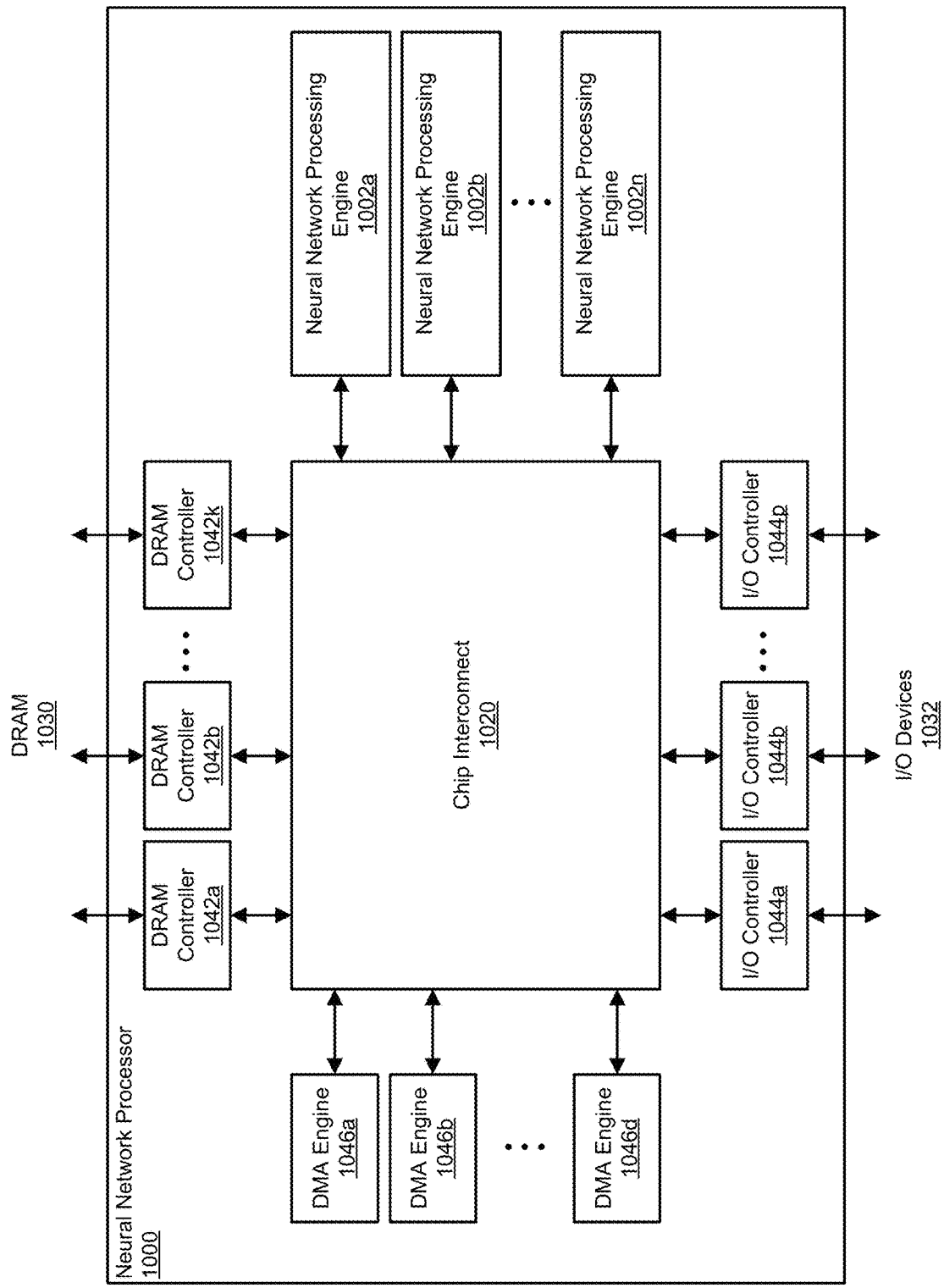
FIG. 10 illustrate an example of a neural network processor that has multiple neural network processing engines.

In various implementations, the neural network processing engine discussed above can be part of a neural network processor. FIG. 10 illustrates an example of a neural network processor 1000 that has multiple neural network processing engines 1002a-1002n. Each of the neural network processing engines 1002a-1002n can include a memory subsystem and processing engine array, and can execute the computation required for a neural network to perform a task for which the neural network was programmed. In the illustrated example, the neural network processor 1000 includes n neural network processing engines 1002a-1002n.

The example neural network processor 1000 further includes DRAM controllers 1042a-1042k for communicating with processor memory, implemented in this example using DRAM 1030. In the illustrated example, the neural network processor 1000 includes k DRAM controllers 1042a-1042k, each of which may be able to communicate with an independent set of banks of DRAM. In other examples, other types of RAM technology can be used for the processor memory. The DRAM controllers 1042a-1042k can also be referred to as memory controllers.

The example neural network processor 1000 further includes Input/Output (I/O) controllers 1044a-1044p for communicating with I/O devices 1032 in the system. The neural network processor 1000 can communicate with I/O devices over, for example, a processor bus. In some examples, the processor bus can be implemented using Peripheral Component Interconnect (PCI) and/or a variation of the PCI bus protocol. The processor bus can connect the neural network processor 1000 to I/O devices 1032 such as, for example, input and output devices, memory controllers, storage devices, and/or network interface cards, among other things. In this example, the neural network processor 1000 includes p I/O controllers 1044a-1044p, each of which may include a separate root complex and may communicate with a separate set of I/O devices 1032. In other examples, other standardized bus protocols, such as Ultra Path Interconnect (UPI) can be used for the host bus. In other examples, a proprietary bus protocol can be used.

The example neural network processor 1000 further includes DMA engines 1046a-1046d that can move data between the neural network processing engines 1002a-1002n, DRAM controllers 1042a-1042k, and I/O controllers 1044a-1044p. In the illustrated example, the neural network processor 1000 includes d DMA engines 1046a-1046d. In some implementations, the DMA engines 1046a-1046d can be assigned to specific tasks, such as moving data from the DRAM controllers 1042a-to the neural network processing engines 1002a-1002n, or moving data between the I/O controllers 1044a-1044p and the neural network processing engines 1002a-1002n. In some implementations, at least one DMA engine 1046a-1046d can be dedicated to each neural network processing engine 1002a-1002n. In some implementations, the DMA engines 1046a-1046d can be treated as a pool instead of being dedicated to a function or component, such that whenever data needs to be moved, an available DMA engine 1046a-1046d is engaged.

In the example neural network processor 1000, the various components can communicate over a chip interconnect 1020. The chip interconnect 1020 primarily includes wiring for routing data between the components of the neural network processor 1000. In some cases, the chip interconnect 1020 can include a minimal amount of logic, such as multiplexors to control the direction of data, flip-flops for handling clock domain crossings, and timing logic.

In some examples, each of the neural network processing engines 1002a-1002n can simultaneously be executing a different neural network. In some examples, two or more of the neural network processing engines 1002a-1002n can be execute the same neural network for different inputs. In some examples, two or more of the neural network processing engines 1002a-1002n can be executing parts of the same neural network (e.g., parts of the same layer or different layers). In some examples, two or more of the neural network processing engines 1002a-1002n can sequentially execute layers of a neural network, such that inputs can be pipeline through the neural network processing engines.

Figure 11:
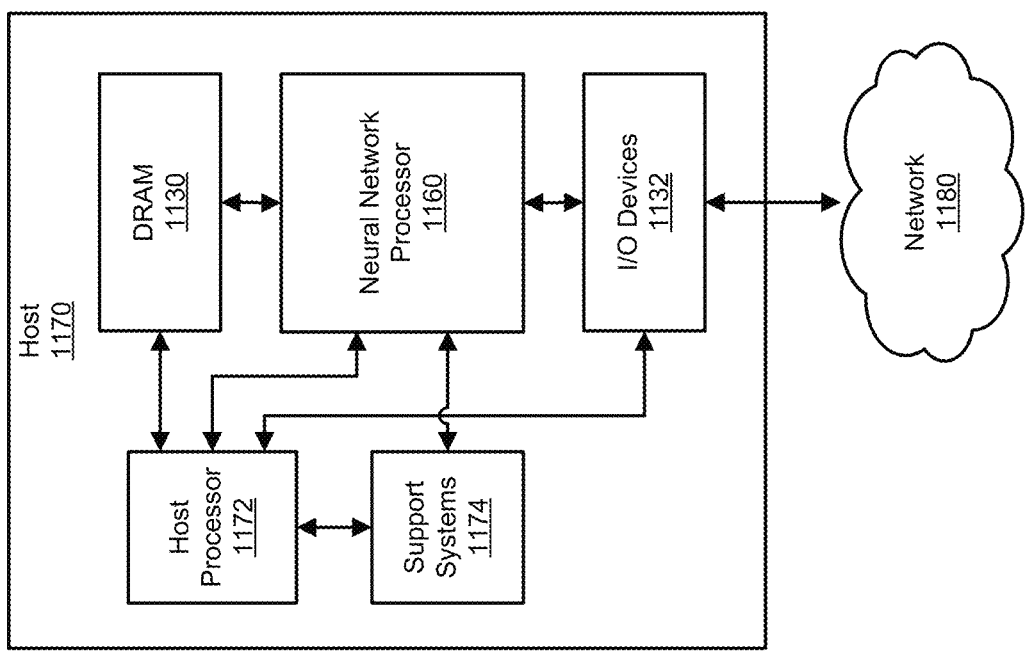
FIG. 11 illustrates an example of a host system in which a neural network processor can be used.

FIG. 11 illustrates an example of a host system 1170 in which a neural network processor 1160 can be used. The example host system 1170 includes the neural network processor 1160, a host processor 1172, DRAM 1130 or processor memory, I/O devices 1132, and support systems 1174. In various implementations, the host system 1170 can include other hardware that is not illustrated here.

The host processor 1172 is a general purpose integrated circuit that is capable of executing program instructions. In some examples, the host processor 1172 can include multiple processing cores. In some examples, the host system 1170 can include more than one host processor 1172. In some examples, the host processor 1172 and the neural network processor 1160 can be one chip, such as, one or more integrated circuits within the same package.

In some examples, software programs executing on the host processor 1172 can receive or generate input for processing by the neural network processor 1160. In some examples, the programs can select an appropriate neural network to execute for a given input. For example, a program may be for language translation, and can select one or more neural networks capable of speech recognition and/or machine translation. In these and other examples, the programs can configure the neural network processor 1160 with the neural network to execute, and/or can select a neural network processing engine on the neural network processor 1160 that has previously been configured to execute the desired neural network. In some examples, once the neural network processor 1160 has started inference on input data, the host processor 1172 can manage the movement of data (such as weights, instructions, intermediate results, results of conditional layers, and/or final results) into or out of the neural network processor 1160.

In some examples, a software program that is using the neural network processor 1160 to conduct inference can read the result from a conditional layer from the neural network processor 1160 and/or from a storage location, such as in DRAM 1130. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinate by software.

The DRAM 1130 is memory that is used by the host processor 1172 for storage of program code that the host processor 1172 is in the process of executing, as well as values that are being operated on. In some examples, the data for a neural network (e.g., weight values, instructions, and other data) can be all or partially stored in the DRAM 1130. DRAM is a common term for processor memory, and though DRAM is volatile memory, processor memory can be volatile and/or non-volatile.

The I/O devices 1132 can include hardware for connecting to user input and output devices, such as keyboards, monitors, and printers, among other devices The I/O devices 1132 can also include storage drives and/or network interfaces for connecting to a network 1180.

In various implementations, the support systems 1174 can include hardware for coordinating the operations of the neural network processor 1160. For example, the support systems 1174 can include a microprocessor that coordinates the activities of the neural network processor 1160, including moving data around on the neural network processor 1160. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 1172. In some examples, the program executed by the microprocessor is stored on the hardware of microprocessor, or on a non-volatile memory chip in the host system 1170. In some examples, the microprocessor and the neural network processor 1160 can be on chip, such as one integrated circuit on the same die and in the same package.

In some examples, the support systems 1174 can be responsible for taking instructions from the host processor 1172 when programs executing on the host processor 1172 request the execution of a neural network. For example, the host processor 1172 can provide the support systems 1174 with a set of input data and a task that is to be performed on the set of input data. In this example, the support systems 1174 can identify a neural network that can perform the task, and can program the neural network processor 1160 to execute the neural network on the set of input data. In some examples, the support systems 1174 only needs to select an appropriate neural network processing engine of the neural network processor. In some examples, the support systems 1174 may need to load the data for the neural network onto the neural network processor 1160 before the neural network processor 1160 can start executing the neural network. In these and other examples, the support systems 1174 can further receive the output of executing the neural network, and provide the output back to the host processor 1172.

In some examples, the support systems 1174 can further act upon the result of a conditional layer in a neural network. For example, the support systems 1174 can read from a neural network processing engine the outcome of testing a condition. Based on the outcome, the support systems 1174 can determine to stop the execution of the neural network (because the condition was met), or let the neural network continue executing (because the condition was not met). In some examples, the support systems 1174 can select a next layer of the neural network to execute, where the outcome of the condition can indicate which layer is to be the next layer. In these examples, the support systems 1174 can instruct a neural network processing engine to begin executing at the selected layer, and/or can load the weights for the selected layer in the neural network processing engine.

In some examples, the operations of the support systems 1174 can be handled by the host processor 1172. In these examples, the support systems 1174 may not be needed and can be omitted from the host system 1170.

FIG. 12 illustrates an example of process 1200 for operating a neural network that can include conditional layers. These methods may be implemented by the systems described above, such as for example the neural network processing engine of FIG. 9, the neural network processor of FIG. 10, and/or the host system of FIG. 11. For example, the process 1200 can be implemented using an integrated circuit.

At step 1202, the process 1200 includes receiving input data at the integrated circuit, the integrated circuit including an array of processing engines and a memory operable to store weight values and instructions for the neural network, and wherein the integrated circuit is operable to use the weight values to perform a task defined for the neural network. In some examples, the integrated circuit includes a neural network processor or a neural network processing engine. In some examples, when the input data is received, the integrated circuit begins executing the neural network, for example by loading weights into the array of processing engines and computing outputs for each layer of the neural network.

In some examples, the array of processing engines includes a set of processing engines. In these examples, each processing engine can be an instance of a same computation circuit. In the array, each processing engine from the set of processing engines can outputs a result directly into another processing engine from the set of processing engines.

In some examples, a neural network includes a plurality of weight values derived from a directed weighted graph and a set of instructions for a computation to be executed for each node in the directed weighted graph. In these examples, the plurality of weight values were previously determined by performing the task using known input data.

At step 1204, the process 1200 includes computing a result, wherein the array of processing engines use the set of intermediate results to compute the result. In various examples, the set of intermediate results can include the outputs of a particular layer of the neural network. In some examples, the set of results values include output from a layer of the neural network other than a last layer, which produces a final result. For example, the set of intermediate results can be from the most recent layer executed by the integrated circuit. In some examples, the array of processing engines is configured to perform a certain function to compute the result. For example, the array of processing engines can be configure to execute softmax on the intermediate results, or another logistic function.

At step 1208, the process 1200 includes reading a conditional instruction from the memory. In some examples, the instruction can, for example, include a test value that the result computed at step 1204 is compared against. In some examples, the test value is part of the data of the neural network. In some examples, the test value is determined during the training of the neural network. For example, the test value can be automatically determined by examining the output of a conditional layer during training of the neural network. As another example, a human designer of the neural network can determine the test value.

At step 1210, the process 1200 includes writing a value to a storage, the value indicating whether the result meets a condition indicated by the conditional instruction. The instruction can, for example, configure the array of processing engines to test the result against the condition. In some examples, determining whether the condition is met includes comparing the result to a test value. For example, the condition may indicate that the condition is met when the result is greater than the test value. In some examples, the result computed at step 1204 includes a set of values. In these examples, determining whether the condition is met includes determining a subset of values including two or more largest values from the set of values, and determining whether a sum of these largest values meets the condition.

In some examples, the storage location is a location in the memory of the integrated circuit. In some examples, the storage location is a register in the integrated circuit. In some examples, the storage location is outside of the integrated circuit, such as in a register of a microprocessor and/or in processor memory.

In some examples, when the condition is met, the result can be used as an outcome for performing the task. For example, the result can be substituted for the output of an output layer of the neural network. In these examples, not all of the layers of the neural network need to be executed to obtain a result.

In some examples, the process 1200 further includes determining that the result meets the condition and terminating performance of the task. Terminating the performance of the task can include, for example, receiving input data and instructions for starting execution of a neural network at the beginning of the neural network. Alternatively, terminating performance of the task can include flushing an in-progress computation from the array of processing engines. Alternatively or additionally, terminating performance of the task can include removing data for the neural network from the memory banks and/or loading data for a different neural network in the memory banks.

In some examples, the process 1200 further includes determining whether the result meets the condition. In these examples, the process 1200 can include selecting a first set of weight values for a first layer of the neural network, where the first set of weight values are selected for continuing performance of the task. In these examples, the first set of weight values are selected instead of a second set of weight values for a second layer of the neural network, where the second set of weight values are selected when the result does not meet the condition. In these examples, first layer is different from the second layer, representing different branches that can be taken in the neural network. In some examples, the conditional instruction includes a value identifying a layer of the neural network at which performance of the task continues when the condition is met. In some examples, the conditional instruction includes a value identifying a layer at which performance of the task continues when the condition is not met. In some examples, when the condition is met or not met, performance of the task continues at a layer at a subsequent layer to a conditional layer.

In some examples, the process 1200 further includes removing the weight values and instructions from the memory when the value meets the condition, in preparation for starting a new inference. In some examples, once the weight values and instructions have been cleared, the process 1200 further includes initiating performance of the task on new input data (e.g., starting a new inference). In some examples, the process 1200 removes the weight value and instructions upon receiving an instruction to do so. In some examples, the instruction may be among the instructions already in the memory.

Figure 13:
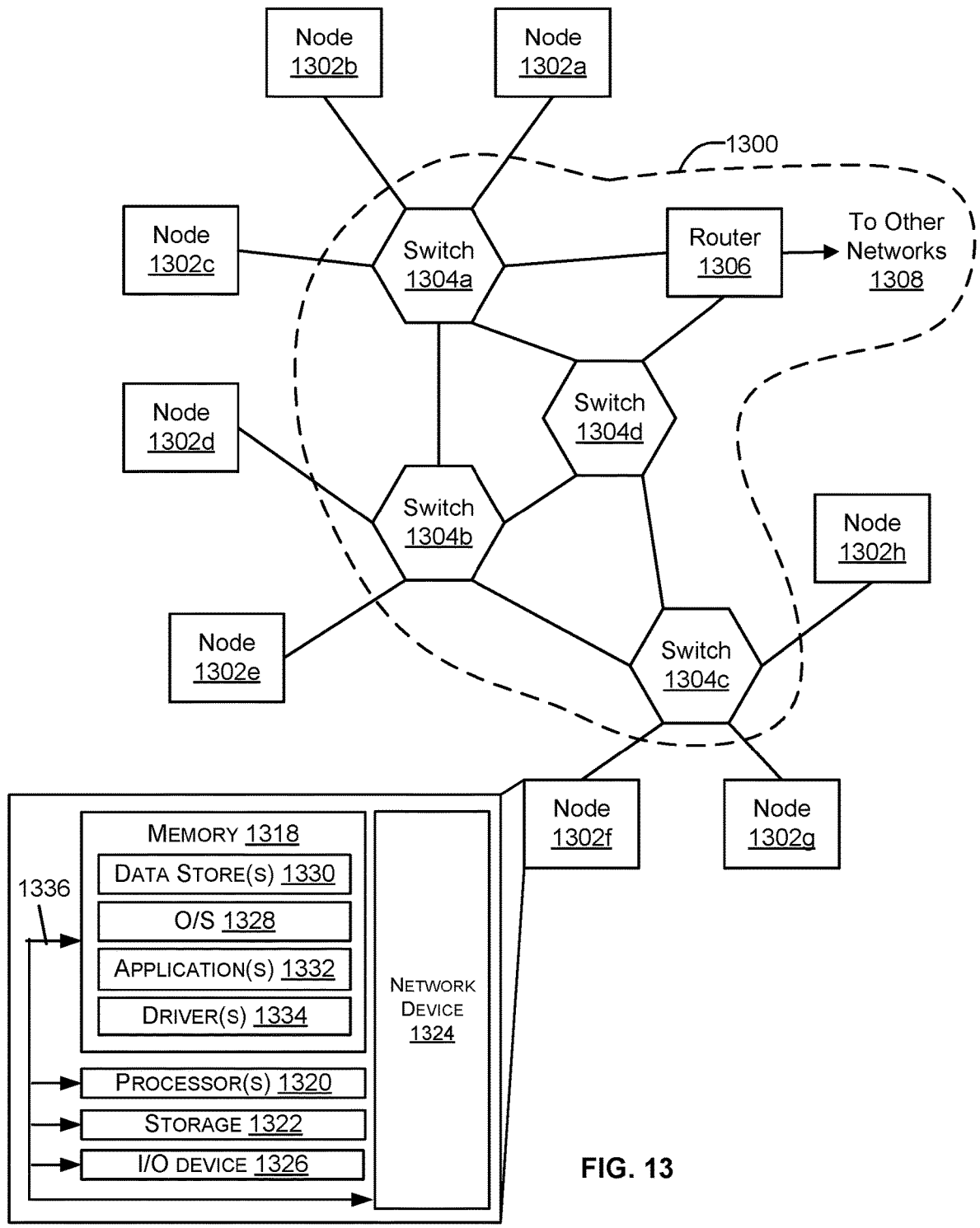
FIG. 13 illustrates an example architecture for features and systems described herein that includes one or more service provider computers and/or a user device connected via one or more networks, according to certain aspects of the disclosure.

FIG. 13 illustrates a network 1300, illustrating various different types of network devices, such as nodes comprising the network device, switches and routers. In certain embodiments, the network 1300 may be based on a switched architecture with point-to-point links. As illustrated in FIG. 13, the network 1300 includes a plurality of switches 1304a-1304d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1304a-1304d may be connected to a plurality of nodes 1302a-1302h and provide multiple paths between any two nodes.

The network 1300 may also include one or more network devices for connection with other networks 1308, such as other subnets, LANs, wide area networks (WANs), or the Internet, and may be referred to as routers 1306. Routers use headers and forwarding tables to determine the best path for forwarding the packets, and use protocols such as internet control message protocol (ICMP) to communicate with each other and configure the best route between any two devices.

In some examples, network(s) 1300 may include any one or a combination of many different types of networks, such as cable networks, the Internet, wireless networks, cellular networks and other private and/or public networks. Interconnected switches 1304a-1304d and router 1306, if present, may be referred to as a switch fabric, a fabric, a network fabric, or simply a network. In the context of a computer network, terms "fabric" and "network" may be used interchangeably herein.

Nodes 1302a-1302h may be any combination of host systems, processor nodes, storage subsystems, and I/O chassis that represent user devices, service provider computers or third party computers.

User devices may include computing devices to access an application 1332 (e.g., a web browser or mobile device application). In some aspects, the application 1332 may be hosted, managed, and/or provided by a computing resources service or service provider. The application 1332 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1308. Additionally, the user device(s) may be part of the distributed system managed by, controlled by, or otherwise part of the service provider computer(s) (e.g., a console device integrated with the service provider computers).

The node(s) of FIG. 13 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1332 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1302a-1302h may include at least one memory 1318 and one or more processing units (or processor(s) 1320). The processor(s) 1320 may be implemented in hardware, computer-executable instructions, firmware, or combinations thereof. Computer-executable instruction or firmware implementations of the processor(s) 1320 may include computer-executable or machine-executable instructions written in any suitable programming language to perform the various functions described.

In some instances, the hardware processor(s) 1320 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1318 may store program instructions that are loadable and executable on the processor(s) 1320, as well as data generated during the execution of these programs. Depending on the configuration and type of the node(s) 1302a-1302h, the memory 1318 may be volatile (such as RAM) and/or non-volatile (such as ROM, flash memory, etc.). The memory 1318 may include an operating system 1328, one or more data stores 1330, one or more application programs 1332, one or more drivers 1334, and/or services for implementing the features disclosed herein.

The operating system 1328 may support nodes 1302a-1302h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1328 may also be a proprietary operating system.

The data stores 1330 may include permanent or transitory data used and/or operated on by the operating system 1328, application programs 1332, or drivers 1334. Examples of such data include web pages, video data, audio data, images, user data, and so on. The information in the data stores 1330 may, in some implementations, be provided over the network(s) 1308 to user devices. In some cases, the data stores 1330 may additionally or alternatively include stored application programs and/or drivers. Alternatively or additionally, the data stores 1330 may store standard and/or proprietary software libraries, and/or standard and/or proprietary application user interface (API) libraries. Information stored in the data stores 1330 may be machine-readable object code, source code, interpreted code, or intermediate code.

The drivers 1334 include programs that may provide communication between components in a node. For example, some drivers 1334 may provide communication between the operating system 1328 and additional storage 1322, network device 1324, and/or I/O device 1326. Alternatively or additionally, some drivers 1334 may provide communication between application programs 1332 and the operating system 1328, and/or application programs 1332 and peripheral devices accessible to the service provider computer. In many cases, the drivers 1334 may include drivers that provide well-understood functionality (e.g., printer drivers, display drivers, hard disk drivers, Solid State Device drivers). In other cases, the drivers 1334 may provide proprietary or specialized functionality.

The service provider computer(s) or servers may also include additional storage 1322, which may include removable storage and/or non-removable storage. The additional storage 1322 may include magnetic storage, optical disks, solid state disks, flash memory, and/or tape storage. The additional storage 1322 may be housed in the same chassis as the node(s) 1302a-1302h or may be in an external enclosure. The memory 1318 and/or additional storage 1322 and their associated computer-readable media may provide non-volatile storage of computer-readable instructions, data structures, program modules, and other data for the computing devices. In some implementations, the memory 1318 may include multiple different types of memory, such as SRAM, DRAM, or ROM.

The memory 1318 and the additional storage 1322, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1318 and the additional storage 1322 are examples of computer storage media. Additional types of computer storage media that may be present in the node(s) 1302a-1302h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1302a-1302h.

Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1302a-1302h may also include I/O device(s) 1326, such as a keyboard, a mouse, a pen, a voice input device, a touch input device, a display, speakers, a printer, and the like. The node(s) 1302a-1302h may also include one or more communication channels 1336. A communication channel 1336 may provide a medium over which the various components of the node(s) 1302a-1302h can communicate. The communication channel or channels 1336 may take the form of a bus, a ring, a switching fabric, or a network.

The node(s) 1302a-1302h may also contain network device(s) 1324 that allow the node(s) 1302a-1302h to communicate with a stored database, another computing device or server, user terminals and/or other devices on the network(s) 1300.

In some implementations, the network device 1324 is a peripheral device, such as a PCI-based device. In these implementations, the network device 1324 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, a bus interface module may implement NVMe, and the network device 1324 may be connected to a computing system using a PCIe interface.

A PCI-based device may include one or more functions. A "function" describes operations that may be provided by the network device 1324. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1324 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 13 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit, comprising:
an array of processing engines; and
a memory operable to store weight values and instructions for a neural network, wherein, during operation of the integrated circuit, the memory is further operable to store intermediate results computed by the array of processing engines;
wherein, upon receiving input data, the integrated circuit is operable to use the weight values to perform a task defined for the neural network, and wherein performing the task includes:
  computing results using a set of intermediate results, wherein the array of processing engines compute the intermediate results using a first set of weight values stored in the memory, the first set of weight values associated with a first layer of the neural network;
  reading an instruction from the memory, wherein the instruction is a conditional instruction associated with a conditional layer of the neural network;
  determining whether the results meet a first condition or a second condition indicated by the instruction;
  writing a value to a storage location, the value indicating whether the results meet the first condition or the second condition;
  based on a determination that the results meet the first condition, continuing performance of the task using a second set of weight values for a second layer of the neural network but not continuing performance of the task using a third set of weight values for a third layer of the neural network, such that the second layer receives an output of the first layer as input;
  based on a determination that the results meet the second condition, continuing performance of the task using the third set of weight values for the third layer but not continuing performance of the task using the second set of weight values for the second layer, such that the third layer receives the output of the first layer as input, and wherein the third layer further receives an output of a fourth layer of the neural network as input, the fourth layer being separate from the first layer, the second layer, the third layer, and the conditional layer; and
  based on a determination that the results do not meet each of the first condition and the second condition, continuing performance of the task using both the second set of weight values for the second layer and the third set of weight values for the third layer, wherein the set of weight values, the second set of weight values, and the third set of weight values are different.

2. The integrated circuit of claim 1, wherein the instruction includes a test value, and wherein determining whether the results meet the first condition or the second condition includes comparing the results to the test value.

3. The integrated circuit of claim 2, wherein the test value is determined when the neural network is trained to perform the task.

4. The integrated circuit of claim 1, wherein the instruction includes a test value, and wherein determining whether the results meet the first condition or the second condition includes determining whether the results are greater than the test value.

5. The integrated circuit of claim 1, wherein the array of processing engines perform a logistic function to compute the results.

6. The integrated circuit of claim 1, wherein the results include a set of values, wherein determining whether the results meet the first condition or the second condition includes:
  determining a subset of values including two or more largest values from the set of values; and
  determining whether a sum of the subset of values meets the first condition or the second condition.

7. The integrated circuit of claim 1, wherein the array of processing engines includes a set of processing engines, wherein each processing engine from the set of processing engines is an instance of a same computation circuit, and wherein each processing engine from the set of processing engines outputs a particular result directly into another processing engine from the set of processing engines.

8. The integrated circuit of claim 1, wherein the neural network includes a plurality of weight values derived from a directed weighted graph and a set of instructions for a computation to be executed for each node in the directed weighted graph, and wherein the plurality of weight values were previously determined by performing the task using known input data.

9. A method implemented using an integrated circuit, comprising:
  receiving input data at the integrated circuit, the integrated circuit including an array of processing engines and a memory operable to store weight values for a neural network and instructions for the neural network, and wherein the integrated circuit is operable to use the weight values to perform a task defined for the neural network;
  computing results using a set of intermediate results, wherein the array of processing engines compute the intermediate results using a first set of weight values stored in the memory, the first set of weight values associated with a first layer of the neural network;
  reading a conditional instruction from the memory associated with a conditional layer of the neural network;

writing a value to a storage location, the value indicating whether the results meet a first condition or a second condition indicated by the conditional instruction;

based on a determination that the results meet the first condition, continuing performance of the task using a second set of weight values for a second layer of the neural network but not continuing performance of the task using a third set of weight values for a third layer of the neural network, such that the second layer receives an output of the first layer as input;

based on a determination that the results meet the second condition, continuing performance of the task using the third set of weight values for the third layer but not continuing performance of the task using the second set of weight values for the second layer, such that the third layer receives the output of the first layer as input, and wherein the third layer further receives an output of a fourth layer of the neural network as input, the fourth layer being separate from the first layer, the second layer, the third layer, and the conditional layer; and based on a determination that the results do not meet each of the first condition and the second condition, continuing performance of the task using both the second set of weight values for the second layer and the third set of weight values for the third layer, and wherein the set of weight values, the second set of weight values, and the third set of weight values are different.

10. The method of claim 9, wherein the instruction includes a test value, and wherein determining whether the results meet the first condition or the second condition includes determining whether the results are greater than the test value.

11. The method of claim 10, wherein the test value is determined when the neural network is trained to perform the task.

* * * * *